(12) United States Patent
Kim et al.

(10) Patent No.: US 11,273,016 B2
(45) Date of Patent: Mar. 15, 2022

(54) METHOD OF MANUFACTURING DIGITAL OVERDENTURE AND HOLDER ABUTMENT MOUNTING GUIDE AND FIXING BAR BENDING APPARATUS FOR HOLDER DEVICE APPLIED THERETO

(71) Applicant: DIO Corporation, Busan (KR)

(72) Inventors: Jin Cheol Kim, Yangsan-si (KR); Jin Baek Kim, Busan (KR)

(73) Assignee: DIO CORPORATION, Busan (KR)

( * ) Notice: Subject to any disclaimer, the term of this patent is extended or adjusted under 35 U.S.C. 154(b) by 269 days.

(21) Appl. No.: 16/705,411

(22) Filed: Dec. 6, 2019

(65) Prior Publication Data

US 2021/0161626 A1  Jun. 3, 2021

(30) Foreign Application Priority Data

Nov. 29, 2019 (KR) .......................... 10-2019-0156415
Nov. 29, 2019 (KR) .......................... 10-2019-0156417
Nov. 29, 2019 (KR) .......................... 10-2019-0156422

(51) Int. Cl.
*A61C 8/00* (2006.01)
*A61C 13/00* (2006.01)
*A61C 13/087* (2006.01)
*A61C 13/107* (2006.01)

(52) U.S. Cl.
CPC .......... *A61C 8/0095* (2013.01); *A61C 8/0048* (2013.01); *A61C 8/0089* (2013.01); *A61C 13/0001* (2013.01); *A61C 13/0004* (2013.01); *A61C 13/0019* (2013.01); *A61C 13/087* (2013.01)

(58) Field of Classification Search
CPC . A61C 8/0048; A61C 8/0089; A61C 13/0004; A61C 13/0019; A61C 13/087; A61C 13/0001
USPC ......................................... 433/173; 29/896.1
See application file for complete search history.

(56) References Cited

U.S. PATENT DOCUMENTS

| 2004/0018469 A1* | 1/2004 | Summers ............. A61C 8/0001 433/173 |
| 2005/0037320 A1* | 2/2005 | Poirier .................... A61C 1/084 433/173 |
| 2006/0194166 A1* | 8/2006 | Jofre Araya ........... A61C 1/084 433/72 |

(Continued)

*Primary Examiner* — Jacqueline T Johanas
*Assistant Examiner* — Holly T. To
(74) *Attorney, Agent, or Firm* — Lex IP Meister, PLLC

(57) ABSTRACT

Disclosed is a method of manufacturing a digital overdenture. The method includes a first operation of aligning and setting a plurality of pieces of implantation information of fixtures according to alveolar bone information in a planning image, a second operation of designing and manufacturing a surgical guide and a holder abutment mounting guide, a third operation of preparing a temporary denture corrected to form a temporary holder insertion portion having an inner surface part into which a holder device is inserted to be shape-matched therewith, in which the surgical guide is installed in the target arch to implant the fixtures and the fixing bar is fixed to the holder abutments moved to and coupled with top ends of the fixtures by the holder abutment mounting guide, and a fourth operation of manufacturing a digital overdenture including an artificial tooth portion and an artificial gum portion.

13 Claims, 7 Drawing Sheets

(56) References Cited

U.S. PATENT DOCUMENTS

| | | | | |
|---|---|---|---|---|
| 2008/0153060 | A1* | 6/2008 | De Moyer | A61C 1/084 433/173 |
| 2009/0263762 | A1* | 10/2009 | Shepard | A61C 8/005 433/174 |
| 2012/0058449 | A1* | 3/2012 | Sklarski | A61C 13/0004 433/173 |
| 2012/0072178 | A1* | 3/2012 | Beaudry | A61C 13/0004 703/1 |
| 2012/0276502 | A1* | 11/2012 | Marshall | A61C 13/0004 433/199.1 |
| 2013/0260337 | A1* | 10/2013 | Duncan | A61C 1/084 433/173 |
| 2014/0088929 | A1* | 3/2014 | Suttin, Sr | G06F 30/00 703/1 |
| 2014/0106303 | A1* | 4/2014 | Giasson | A61C 13/0004 433/173 |
| 2016/0157967 | A1* | 6/2016 | Kim | A61C 5/70 433/201.1 |
| 2016/0287336 | A1* | 10/2016 | Kim | G06T 7/0012 |
| 2018/0250102 | A1* | 9/2018 | Schulter | A61C 8/0095 |
| 2018/0263737 | A1* | 9/2018 | Simmonds | A61C 9/0053 |
| 2019/0336245 | A1* | 11/2019 | Liacouras | A61C 13/0004 |
| 2021/0106410 | A1* | 4/2021 | Kim | A61C 13/12 |
| 2021/0113307 | A1* | 4/2021 | Kim | A61C 8/0053 |

\* cited by examiner

[Fig. 1]
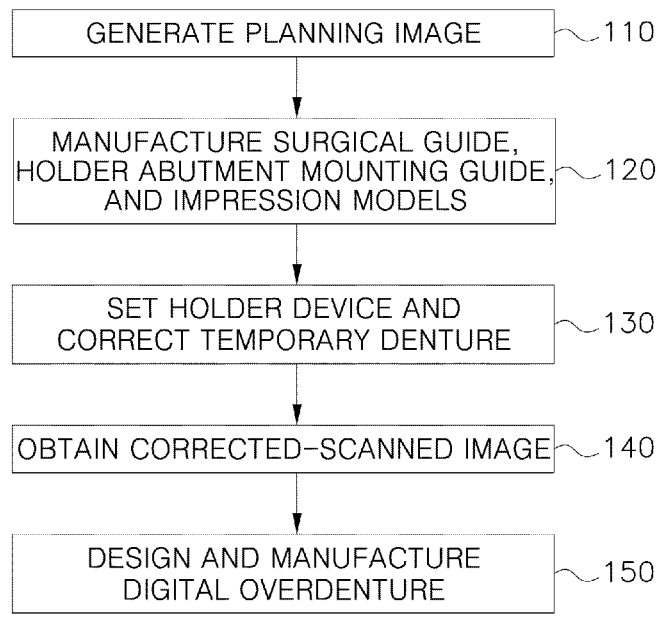
[Fig. 2]
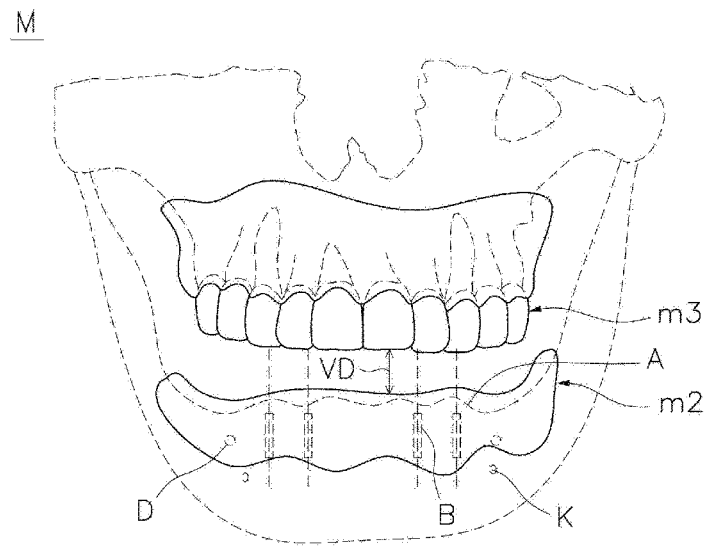

[Fig. 3]
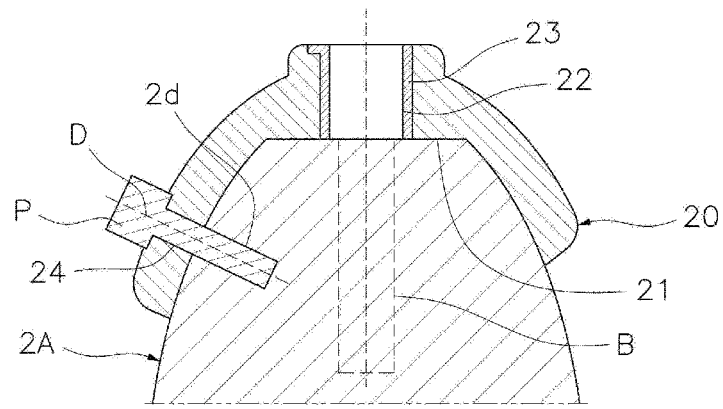
[Fig. 4a]
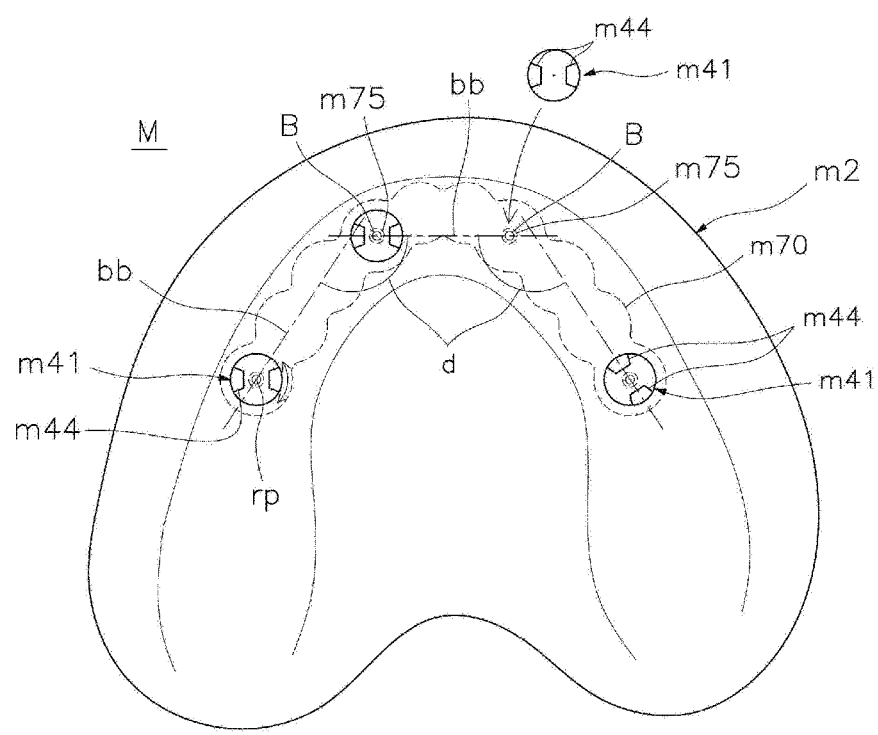
[Fig. 4b]
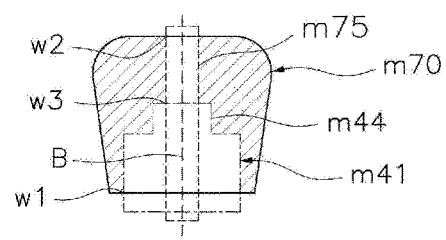

[Fig. 5a]
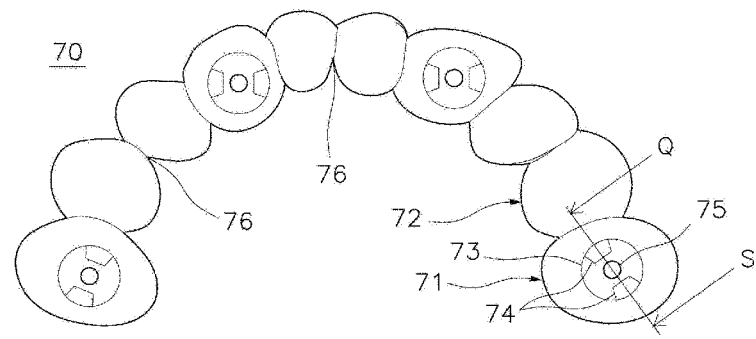
[Fig. 5b]
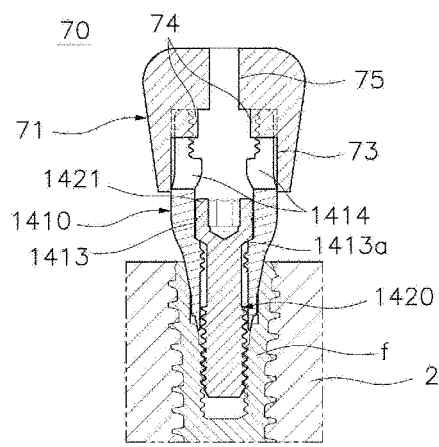
[Fig. 6]
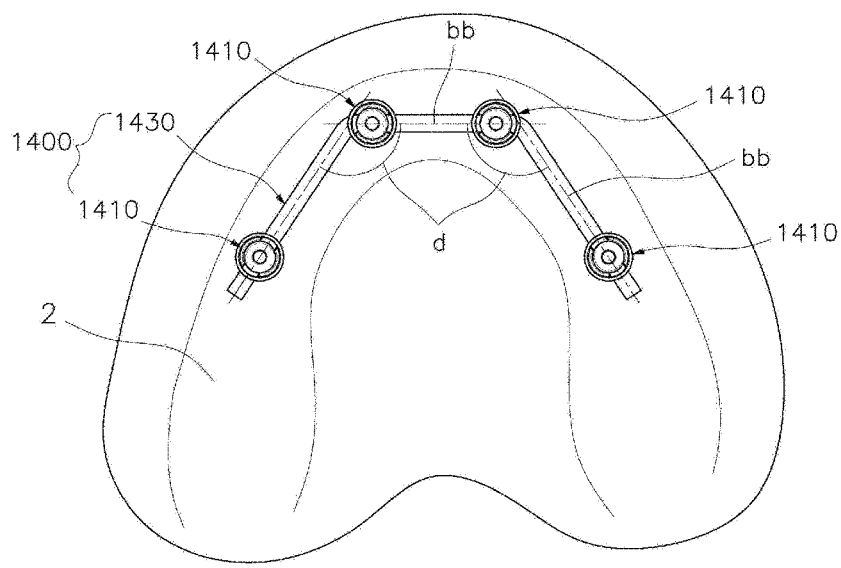

[Fig. 7]
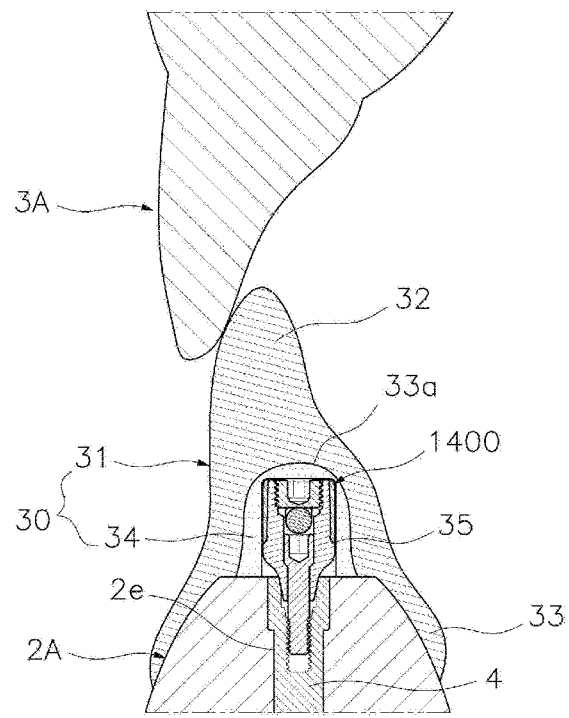
[Fig. 8]
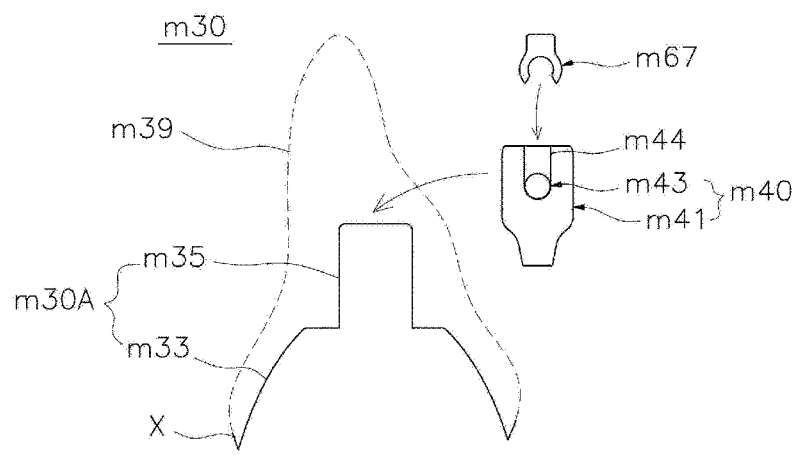

[Fig. 9]
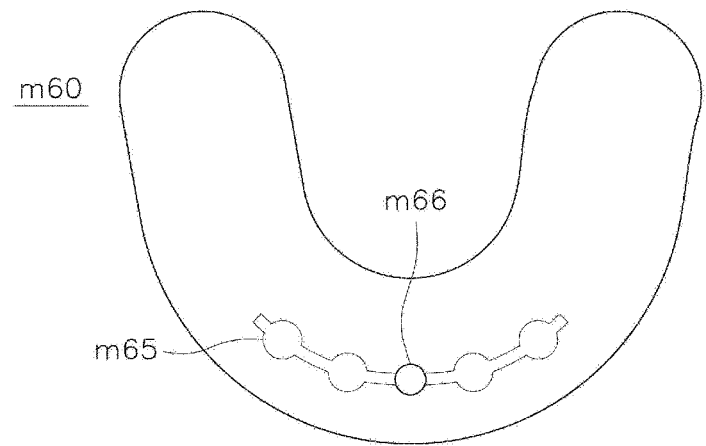
[Fig. 10a]
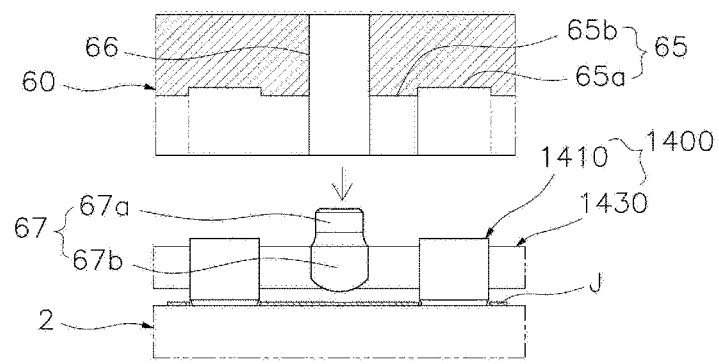
[Fig. 10b]
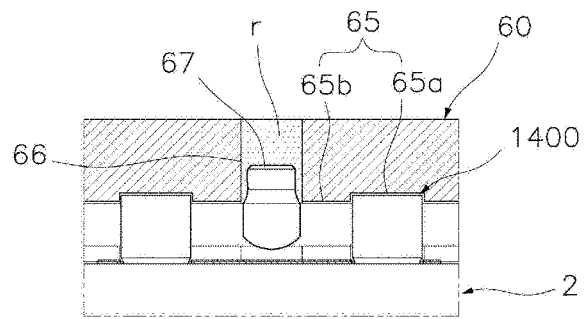

[Fig. 11a]
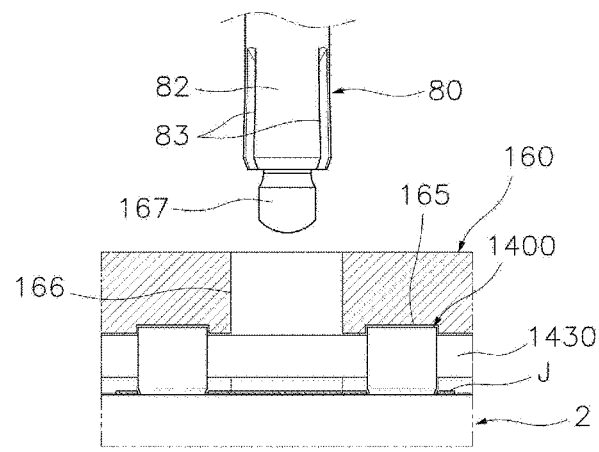
[Fig. 11b]
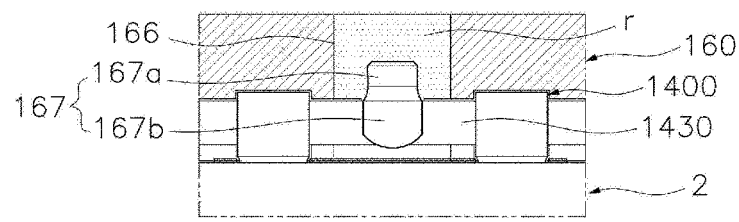
[Fig. 12]
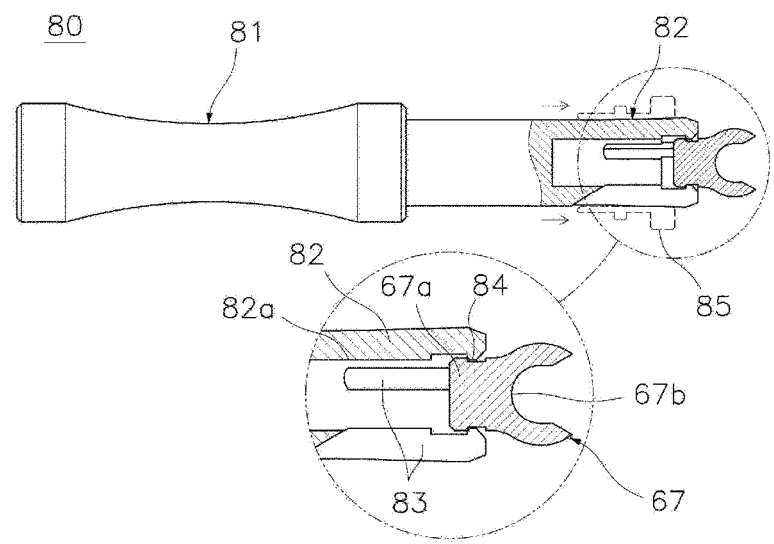

[Fig. 13]
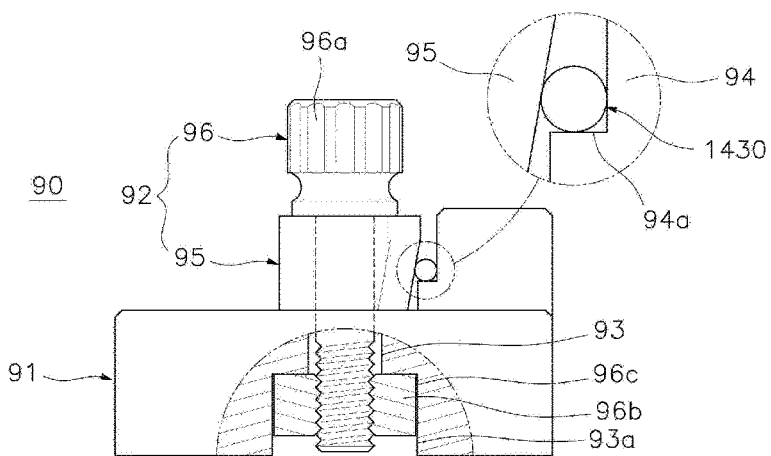
[Fig. 14]
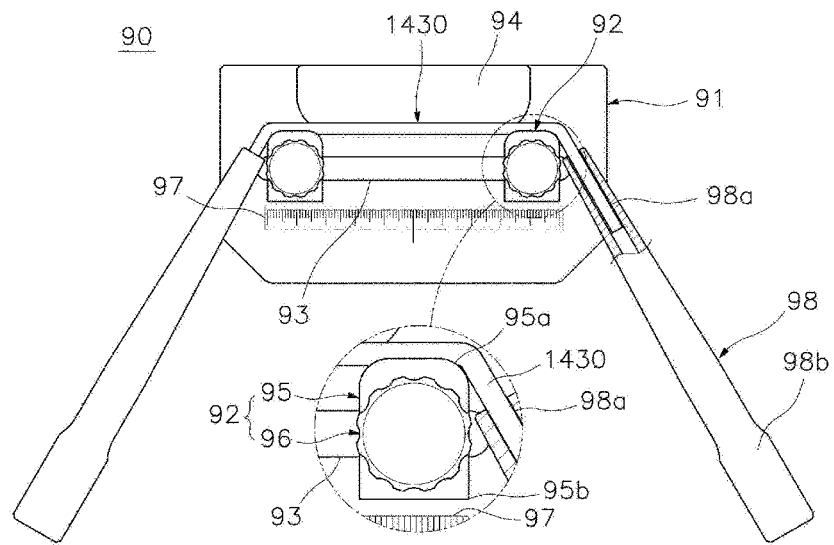

METHOD OF MANUFACTURING DIGITAL OVERDENTURE AND HOLDER ABUTMENT MOUNTING GUIDE AND FIXING BAR BENDING APPARATUS FOR HOLDER DEVICE APPLIED THERETO

CROSS-REFERENCE TO RELATED APPLICATION

This application claims the benefit of Korean Applications No. 10-2019-156415, 10-2019-156417, 10-2019-156422 filed on Nov. 29, 2019, which were hereby incorporated by reference as fully set forth herein.

BACKGROUND

1. Field of the Invention

The present invention relates to a method of manufacturing a digital overdenture and a holder abutment mounting guide and a fixing bar bending apparatus for a holder device which are applied thereto, and more particularly, to a method of manufacturing a digital overdenture with improved manufacturing convenience and preciseness and a holder abutment mounting guide and a fixing bar bending apparatus for a holder device which are applied thereto.

2. Discussion of Related Art

In general, a denture or a dental prosthesis is a dental restoration which replaces a broken natural tooth and artificially restores an exterior and function thereof. Here, the denture or dental prosthesis may be installed in the oral cavity to restore a mastication function and to prevent the periodontium from being deformed and may be classified into partial/complete dentures and partial/complete dental prostheses according to the number of damaged teeth.

Meanwhile, dental cement is applied to an internal shape-coupling groove such that the denture is bonded to and installed on a surface of a gum. Accordingly, since an occlusal pressure is directly applied to the gum, a feeling of irritation and pain are caused. On the other hand, the dental prosthesis is fixed to a fixture implanted into an alveolar bone such that a feeling of irritation and pain of a gum caused by an occlusal pressure are reduced. However, the dental prosthesis is substantially permanently fixed such that it is difficult to be managed. Thus, an overdenture which overcomes disadvantages of the denture and the dental prosthesis has been disclosed.

In detail, the overdenture is detachable from the oral cavity like the denture while being fixed to a fixture implanted into an alveolar bone like the dental prosthesis such that management such as cleaning and the like is easy. Here, the overdenture includes a coupling device selectively coupled with an abutment fixed to the fixture.

Here, a conventional coupling device is provided as a ball type separately matched with each of a plurality of such fixtures/abutments implanted into and fixed to the alveolar bone or provided as a bar type which passes the plurality of fixtures/abutments.

Here, since the ball type coupling device is separately coupled with each of the fixtures/abutments, preciseness of a position of the abutment is necessary. Accordingly, when any one of the coupling devices is not formed in a precise position, an overdenture is not precisely installed.

Also, the bar type coupling device includes a through insertion portion formed to allow a fixing bar passing a plurality of such fixtures/abutments to be inserted therein and is more easily fastened than the ball type coupling device. Here, the fixing bar is provided as a stiff metal material which is bent to intersect with an implantation positions of the fixtures so as to pass through a plurality of fixtures/abutments pre-implanted into a target arch. Also, it is necessary to dispose the through insertion portion to be opened toward both sides to correspond to a bent shape of the fixing bar.

However, in the conventional case, the abutments are transferred and fixed to the fixtures one by one such that both opening directions of the through insertion portion of the abutment do not coincide with an extension direction of the fixing bar. Also, in the conventional case, both ends of the fixing bar are gripped by hands and simply bent to be used.

This causes a problem in which the both opening directions of the through insertion portion do not coincide with the extension direction of the fixing bar or a direction in which the fixing bar is bent and extends does not intersect with the implantation position of the fixture. Accordingly, the holder abutment is twisted by the fixing bar such that a fixing force for the fixture is loosened or the holder abutment is separated from the fixture. Also, a restoration force of the fixing bar is applied to a part engaged with the fixing bar while being twisted such that a bone may be dissolved or broken.

Meanwhile, generally, designs of an overdenture and a coupling device are formed on the basis of an impression body obtained corresponding to an oral cavity and a computerized tomography (CT) image. Here, in the case of the CT image, information about an alveolar bone is easily obtained but it is difficult to obtain information about a gum which is soft tissue. Also, in the case of the impression body, excessive time is consumed during a process of obtaining an impression and manufacturing a model and it is difficult to obtain precise oral cavity information because the gum is pressurized while the gum is obtained. Consequently, a manufactured overdenture is not precisely installed in the oral cavity such that a feeling of irritation and pain increase in use.

SUMMARY OF THE INVENTION

According to an aspect of the present invention, there is provided a method of manufacturing a digital overdenture. The method includes a first operation of aligning and setting a plurality of pieces of implantation information of fixtures according to alveolar bone information in a planning image in which surface information and alveolar bone information of a target arch and an opposing arch are displayed as three-dimensional (3D) images aligned corresponding to a preset vertical dimension, a second operation of designing and manufacturing a surgical guide, in which a plurality of guide holes configured to guide implanting of the fixture on the basis of the implantation information are formed, and a holder abutment mounting guide, in which a plurality of accommodation grooves in which top ends of holder abutments to be coupled with the fixtures are accommodated are formed, a third operation of preparing a temporary denture corrected to form a temporary holder insertion portion having an inner surface part into which a holder device including the holder abutments and a fixing bar is inserted to be shape-matched therewith, in which the surgical guide is installed in the target arch to implant the fixtures and the fixing bar bent to intersect with the implantation information is fixed to the holder abutments moved to and coupled with top ends of the fixtures by the holder abutment mounting guide and through fastening screws, and a fourth operation of manufacturing a digital overdenture including an artificial gum portion having an inner surface part, at which a holder insertion portion is formed, and an artificial tooth portion set to be occluded with the opposing arch on the basis of a corrected-scanned image obtained by scanning the corrected temporary denture and swapped to outwardly expose 3D surface information of the temporary holder insertion portion.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a flowchart illustrating a method of manufacturing a digital overdenture according to one embodiment of the present invention;

FIG. 2 is an exemplary view illustrating a planning image in the method of manufacturing the digital overdenture according to one embodiment of the present invention;

FIG. 3 is an exemplary view illustrating a surgical guide in the method of manufacturing the digital overdenture according to one embodiment of the present invention;

FIGS. 4A and 4B are exemplary views illustrating a process of designing a holder abutment mounting guide in the method of manufacturing the digital overdenture according to one embodiment of the present invention;

FIGS. 5A and 5B are exemplary views illustrating an applied holder abutment mounting guide and an example of using the holder abutment mounting guide in the method of manufacturing the digital overdenture according to one embodiment of the present invention;

FIG. 6 is an exemplary view illustrating a state in which a holder device is fixed to an oral cavity in the method of manufacturing the digital overdenture according to one embodiment of the present invention;

FIG. 7 is an exemplary view illustrating a process of correcting a temporary denture in the method of manufacturing the digital overdenture according to one embodiment of the present invention;

FIG. 8 is an exemplary view illustrating a process of obtaining a corrected-scanned image in the method of manufacturing the digital overdenture according to one embodiment of the present invention;

FIG. 9 is an exemplary view illustrating a process of obtaining digital overdenture design information in the method of manufacturing the digital overdenture according to one embodiment of the present invention;

FIGS. 10A and 10B are exemplary views illustrating a process of fixing a clip in the method of manufacturing the digital overdenture according to one embodiment of the present invention;

FIGS. 11A and 11B are exemplary views illustrating a modified example of the process of fixing the clip in the method of manufacturing the digital overdenture according to one embodiment of the present invention;

FIG. 12 is an exemplary view illustrating an example of using a clip mounting holder applied to the method of manufacturing the digital overdenture according to one embodiment of the present invention; and FIGS. 13 and 14 are exemplary views illustrating an applied fixing bar bending apparatus for the holder device and an example of using the fixing bar bending apparatus in the method of manufacturing the digital overdenture according to one embodiment of the present invention.

DETAILED DESCRIPTION OF EXEMPLARY EMBODIMENTS

Detailed Description of the Preferred Embodiment

Hereinafter, a method of manufacturing a digital overdenture and a holder abutment mounting guide and a fixing bar bending apparatus for a holder device which are applied thereto according to one exemplary embodiment of the present invention will be described in detail with reference to the attached drawings.

FIG. 1 is a flowchart illustrating the method of manufacturing the digital overdenture according to one embodiment of the present invention, and FIG. 2 is an exemplary view illustrating a planning image in the method of manufacturing the digital overdenture according to one embodiment of the present invention.

As shown in FIGS. 1 and 2, the method of manufacturing the digital overdenture according to the present invention includes a series of operations such as generating a planning image (110), manufacturing auxiliary devices for manufacturing a digital overdenture, such as a surgical guide, a holder abutment mounting guide, an impression model, and the like (120), setting a holder device and correcting a temporary denture (130), obtaining a corrected-scanned image (140), and designing and manufacturing the digital overdenture (150).

Meanwhile, a target arch which will be described below may be preferably understood as a dental arch which needs the digital overdenture and will be described and illustrated as a lower jaw that is an edentulous jaw. Also, an opposing arch may be preferably understood as a dental arch occluded with the target arch and will be described and illustrated as an upper jaw that is a dentulous jaw. According to circumstances, the present invention may be equally applied to a process of manufacturing a digital overdenture to be installed in a case in which an upper jaw or both upper and lower jaws are edentulous jaws.

Also, the temporary denture is a denture preliminarily manufactured to obtain precise design information on a final digital overdenture which is finally manufactured, and the digital overdenture may be understood as a dental restoration to be actually installed and used in an oral cavity. The digital overdenture is fixed to an alveolar bone through a fixture like a dental prosthesis but is detachable from the oral cavity like a denture. Here, since the temporary denture may not only provide design information for manufacturing the digital overdenture but also be temporarily used by a patient during a period of manufacturing the digital overdenture, utilization and convenience during a dental restoration process may be significantly improved.

The method of manufacturing the digital overdenture may be performed through a digital overdenture manufacturing system including an imaging device, a planning portion, and a manufacturing apparatus.

In detail, the imaging device is configured to obtain surface information m2 and m3 and alveolar bone information A on the target arch and the opposing arch and may be preferably understood as a concept including an oral scanner and a computerized tomography (CT) imaging device. That is, a three-dimensional (3D) image of the surface information m2 and m3 on outer surfaces of gum parts of the target arch and opposing arch is obtained using the oral scanner. Also, the alveolar bone information A, which allows a shape and a curve of an alveolar bone and a position of a lower alveolar nerve K to be checked, is obtained using the CT imaging device.

Also, the planning portion may be preferably understood as a computer device which collects, calculates, and models information obtained using the imaging device and information prestored in the planning portion. That is, the surface information m2 and m3 on the target arch and the opposing arch and the alveolar bone information A which are obtained using the imaging device are loaded on the planning portion and displayed as a 3D image. Also, the surface information m2 and m2 and the alveolar bone information A may be arranged corresponding to a preset vertical dimension VD and generated as a planning image M for designing the digital overdenture. Here, each piece of the surface information m2 and m3 and the alveolar bone information A may be matched on the basis of comparative regions mutually matched corresponding to the arches. For example, the opposing arch may be matched with a comparative region such as the surface, interdental gap, or the like of residual teeth, and the target arch may be attached to an alignment marker and matched with an image of the alignment marker displayed on each piece of information as the comparative region.

In addition, the surface information m2 and m3 and the alveolar bone information A may be aligned through a scanned image for a combined bite which guides a vertical dimension VD of a patient or an image obtained by scanning an oral cavity in which the combined bite is installed. The combined bite may be preferably understood as a height that is compensated through an occlusal pressure while being occluded between the target arch and the opposing arch.

Here, a plurality of pieces of implantation information B of the fixtures arranged inside the alveolar bone information A are aligned in the planning image M. In detail, the implantation information B may be preferably disposed on the anterior teeth side in consideration of a position of the lower alveolar nerve K. Through this, a complicated and precise drilling process for implanting the fixture into an alveolar bone on a molar teeth side to be inclined is not necessary. Accordingly, a level of difficulty in treatment for restoring a tooth may decrease, and convenience in treatment may be significantly improved.

Also, the manufacturing apparatus may be preferably understood as a 3D printer or molding apparatus which manufactures a real digital overdenture according to design information of the digital overdenture. Hereinafter, the manufacturing apparatus may be preferably understood as a 3D printer. In addition, the surgical guide, the holder abutment mounting guide (hereinafter referred to as a mounting guide), and the temporary denture may also be three-dimensionally printed using the manufacturing apparatus. The 3D printer may be preferably provided as a digital light processing (DLP) type stereolithographic printer which cures a cross section patterned by light energy of a lamp or a light emitting diode (LED). Through this, each component being three-dimensionally printed may be precisely three-dimensionally printed with a minimum error from design information set on the basis of the planning image M. Accordingly, an operation of additionally correcting the three-dimensionally printed component may be substantially omitted such that manufacturing convenience and quickness may be further improved.

FIG. 3 is an exemplary view illustrating a surgical guide in the method of manufacturing the digital overdenture according to one embodiment of the present invention. Also, FIGS. 4A and 4B are exemplary views illustrating a process of designing a holder abutment mounting guide in the method of manufacturing the digital overdenture according to one embodiment of the present invention, and FIGS. 5A and 5B are exemplary views illustrating an applied holder abutment mounting guide and an example of using the holder abutment mounting guide in the method of manufacturing the digital overdenture according to one embodiment of the present invention. Also, FIG. 6 is an exemplary view illustrating a state in which a holder device is fixed to an oral cavity in the method of manufacturing the digital overdenture according to one embodiment of the present invention, and FIG. 7 is an exemplary view illustrating a process of correcting a temporary denture in the method of manufacturing the digital overdenture according to one embodiment of the present invention. Also, FIG. 8 is an exemplary view illustrating a process of obtaining a corrected-scanned image in the method of manufacturing the digital overdenture according to one embodiment of the present invention, and FIG. 9 is an exemplary view illustrating a process of obtaining digital overdenture design information in the method of manufacturing the digital overdenture according to one embodiment of the present invention. Also, FIGS. 10A and 10B are exemplary views illustrating a process of fixing a clip in the method of manufacturing the digital overdenture according to one embodiment of the present invention.

As shown in FIGS. 2 to 10B, design information on the surgical guide, the mounting guide, and the impression model is obtained on the basis of the planning image M. Also, each piece of the design information is transmitted to the manufacturing apparatus such that the surgical guide 20, the mounting guide 70, and the impression models 2A and 3A are really manufactured.

In detail, referring to FIG. 3, the surgical guide 20 may be understood as an auxiliary device used for implanting the fixture into the alveolar bone corresponding to the implantation information B. Here, the surgical guide 20 includes a fixing groove portion 21, a guide hole 22, and a surgical anchor fixing portion 24.

In detail, the fixing groove portion 21 may be formed to be shape-matched with the target arch. Also, the guide hole 22 may be formed passing therethrough corresponding to the implantation information B. Here, a drilling process of forming an implantation hole into the alveolar bone is previously performed to implant the fixture. Accordingly, a diameter of the guide hole 22 is formed to correspond to an outer diameter of an end part of a drilling device for drilling and implanting the fixture. Here, to reduce and prevent a frictional force and deformation caused by rotation of the drilling device, a brass sleeve 23 may be fastened to the surgical guide 20. That is, the guide hole 22 may be understood as being formed in the sleeve 23. Additionally, one or more of such surgical anchor fixing portions 24 may be provided along the side part of the surgical guide 20 such that an anchor pin P passes therethrough and is fixed to the target arch.

The surgical guide 20 is designed on the basis of a 3D image of each piece of information displayed on the planning image. In detail, design information on the surgical guide 20 is formed by setting design information on the fixing groove portion 21 corresponding to the alveolar bone information A to be shape-matched with the alveolar bone and setting the guide hole 22 corresponding to the implantation information B. Also, an operation of setting design information on the surgical anchor fixing portion 24 corresponding to preset anchor pin information D to fasten the anchor pin P is included.

Meanwhile, referring to FIGS. 4A to 7, it may be understood that a holder device 1400 is installed in the target arch 2 to detachably fix the digital overdenture to the oral cavity. Here, the holder device 1400 includes a holder abutment 1410 implanted into a fixture f and a fixing bar 1430 fixed via the holder abutment 1410.

In detail, a bottom end part of the holder abutment 1410 is fastened to a top of the fixture f through a fastening screw 1420. Also, a through insertion portion 1414 is formed at a top end part such that the fixing bar 1430 is inserted thereinto and fixed through a pressurizing device 1440 such as a pressurizing screw and the like. The through insertion portion 1414 is formed, as a slot groove recessed downward along a longitudinal direction, at the top end part of the holder abutment 1410. That is, when the fixing bar 1430 is inserted into the through insertion portion 1414 while the pressurizing device 1440 is coupled with the top end part of the holder abutment 1410, the fixing bar 1430 is pressurized and fixed between the pressurizing device 1440 and an inner end of the through insertion portion 1414.

Here, the fixing bar 1430 is bent and provided corresponding to a bending angle d to pass through a plurality of such holder abutments 1410. Here, to allow the fixing bar 1430 to intersect with the implantation information B, the bending angle d is set on the basis of the surface information m2 and the implantation information B of the target arch. Also, bending information bb of the fixing bar 1430 is set in consideration of the bending angle d.

Also, the mounting guide 70 is used for simultaneously mounting and moving the plurality of holder abutments 1410 to a top of the plurality of such fixtures f implanted into the alveolar bone according to the implantation information B. Also, the mounting guide 70 is used for guiding fastening of the fastening screw 1420 using a fastening device such as a drill, a driver, or the like in a state of the holder abutments 1410 moved to the top of the fixtures f. The mounting guide 70 includes a plurality of mounting body portions 71 selectively coupled with top ends of the holder abutments 1410 and in which an accommodation groove 73 is formed, and a bridge body portion 72 which connects the mounting body portions 71.

Here, the mounting guide 70 is manufactured by being designed and three-dimensionally printed on the basis of the implantation information B.

In detail, a virtual mounting base m70 rounded corresponding to a dental arch line of the target arch is virtually disposed between pieces of the surface information m2 and m3 (refer to FIG. 2) of the target arch and the opposing arch aligned corresponding to the vertical dimension VD (refer to FIG. 2). Here, the virtual mounting base m70 may be understood as 3D surface information corresponding to a basic shape of the mounting guide 70. The virtual mounting base m70 may be set as a simply rounded bar shape corresponding to the dental arch line, and may be set as a consecutive teeth shape in which pieces of standard tooth information are connected corresponding to the dental arch line. Hereafter, the virtual mounting base m70 being set as the consecutive teeth shape will be described and illustrated as an example.

Here, the consecutive teeth shape may be set as a shape in which teeth of an artificial tooth portion included in the digital overdenture are connected. That is, the design information on the mounting guide 70 and design information on the artificial tooth portion may be set on the basis of the same standard tooth information. Accordingly, 3D external shape information required for designing the digital overdenture may be minimized, and convenience in designing may be significantly improved.

Here, the virtual mounting base m70 is virtually disposed corresponding to the implantation information B as a whole. That is, the virtual mounting base m70 is virtually disposed to allow an outer perimeter thereof to surround, as a whole, the plurality of pieces of implantation information B such that the plurality of pieces of implantation information B are to be overlapped with an inside of the virtual mounting base m70. Also, a virtual holder abutment m41 may be virtually disposed corresponding to the implantation information B. Here, the virtual holder abutment m41 may be understood as 3D external shape information of the real holder abutment 1410. Here, the virtual holder abutment m41 is virtually disposed on the basis of a central point rp of the implantation information B and is virtually overlapped with the virtual mounting base m70.

In addition, a virtual through region m75 having a cylindrical shape overlapped with the virtual holder abutment m41 and extending upward may be virtually disposed on the basis of the implantation information B. Here, the virtual through region m75 is utilized as design information of a through hole 75 into which the fastening device for coupling the holder abutment 1410 with the fixture f is inserted. To this end, the virtual through region m75 may be set to have an inner diameter corresponding to a diameter of an end part of the fastening device.

Here, outer surfaces of the virtual holder abutments m41 and the virtual through regions m75, which are virtually overlapped with the virtual mounting base m70, are swapped with inner surfaces of a virtual accommodation groove and a virtual through hole such that design information of the mounting guide 70 is set. Here, swapping may be preferably understood as a preset image that is substituted or exchanged with another image or a modified image according to image processing.

In addition, referring to FIG. 4B, a part protruding outward on the basis of a first overlap boundary w1 formed when the virtual holder abutments m41 are virtually overlapped with the inside of the 3D external shape information of the virtual mounting base m70 is eliminated. Also, design information on an opening side of the accommodation groove 73 is set along the first overlap boundary w1 and a part remaining inside the virtual mounting base m70 is set as the virtual accommodation groove that is design information of the accommodation groove 73. Also, the virtual through region m75 is overlapped with 3D external shape information of the virtual mounting base m70 and the virtual holder abutment m41 such that a second overlap boundary w2 and a third overlap boundary w3 are formed. Also, parts protruding to the outside of the second overlap boundary w2 and the inside of the third overlap boundary w3 are eliminated. Here, an inner surface which connects the second overlap boundary w2 with the third overlap boundary w3 is set as a virtual through hole that is the design information of the through hole 75.

Also, the design information of the mounting guide which includes the virtual accommodation groove and the virtual through hole is transmitted to the manufacturing apparatus and three-dimensionally printed so as to manufacture the real mounting guide 70. Since the accommodation groove 73 is formed in the mounting guide 70 at a position corresponding to each piece of the implantation information B, the plurality of holder abutments 1410 may be moved to the top of the fixture f using one mounting guide 70.

Here, design and manufacturing may be performed to include a component configured to align both opening directions of the through insertion portion 1414 with the accommodation groove 73. Through this, both opening directions of the through insertion portion 1414 formed in the holder abutment 1410 may correspond to a direction in which the fixing bar 1430 is bent.

In detail, a virtual angle alignment portion m44 is formed, to be recessed, at a position of the virtual holder abutment m41 corresponding to the through insertion portion 1414. Here, the virtual angle alignment portion m44 may be understood as 3D external shape information of an angle alignment portion formed at a top end of the real holder abutment 1410. Here, the angle alignment portion may be understood as specifying a top end portion of the through insertion portion 1414. Also, the virtual angle alignment portion m44 is formed in the virtual holder abutment m41 while being formed to be recessed corresponding to a top end of the through insertion portion 1414.

Here, bending information bb of the fixing bar intersecting with the implantation information B while being bent at the bending angle d and connected thereto may be set in the surface information m2 of the target arch. Also, the virtual holder abutment m41 including the virtual angle alignment portion m44 is virtually disposed corresponding to each piece of the implantation information B.

Also, the vertical angle alignment portion m44 is virtually rotated and aligned to correspond to the bending information bb. In detail, the virtual holder abutment m41 is rotated on the basis of the central point rp of the implantation information B while an arrangement direction of the virtual angle alignment portion m44 is adjusted to coincide with an extension direction of the bending information bb. Also, the virtual angle alignment portion m44 is swapped so as to protrude toward an inside of the virtual accommodation groove and be set as a virtual alignment shape-matching portion 74.

Here, the virtual mounting base m70, the virtual holder abutment m41, the virtual angle alignment portion m44, and the virtual through region m75 are stored as surface information without a substantial thickness. That is, outer surface information of the virtual holder abutment m41, the virtual angle alignment portion m44, and the virtual through region m75 has coordinate values with respect to each outer surface outline and coordinate values with respect to each inner surface outline which are substantially equal to each other. Accordingly, the outer surface outline of each of the virtual holder abutment m41, the virtual angle alignment portion m44, and the virtual through region m75 is swapped with an inner surface outline of the virtual mounting base m70 such that the design information of the mounting guide 70 may be quickly and precisely set.

Also, the mounting guide 70 manufactured using the above process includes the mounting body portion 71 and the bridge body portion 72. In detail, the plurality of mounting body portions 71 are provided at positions corresponding to positions at which the fixtures f are implanted. Here, the accommodation groove 73 having an inner surface outline corresponding to an outer surface outline of a top end of the holder abutment 1410 is formed in the mounting body portion 71. Also, the through hole 75, into which the fastening device is inserted, is formed above the accommodation groove 73. In addition, the bridge body portion 72 is provided to connect the plurality of mounting body portions 71 corresponding to a dental arch line of the target arch.

Accordingly, when the top end of the holder abutment 1410 is accommodated in the accommodation groove 73, the through insertion portion 1414 is shape-matched with the alignment shape-matching portion 74 to be mounted while the opening directions are aligned. Here, the fastening hole 1413 passes through a central part of the holder abutment 1410 in a longitudinal direction, and a holding step 1413a protrudes radially inward along a bottom end part of the fastening hole 1413. Accordingly, a head portion 1421 formed at a top end of the fastening screw 1420 may be moved with the holder abutment 1410 while being held by the holding step 1413a. Also, as the fastening device is inserted through the through hole 75 and a rotational fastening force is provided to the fastening screw 1420, the holder abutment 1410 is fixed to the fixture f.

As described above, since the mounting guide 70 is capable of mounting and moving the plurality of holder abutments 1410 to the top of the fixture f at the same time, convenience in treatment may be significantly improved. Here, the mounting guide 70 is precisely designed and manufactured on the basis of the surface information m2 of the target arch, the implantation information B, the bending information bb, and the virtual holder abutment m41. Accordingly, even when the plurality of holder abutments 1410 are moved by the mounting guide 70 at the same time, they may be arranged to be aligned with the fixtures f at precise positions.

Also, the alignment shape-matching portion 74 shape-matched with the angle alignment portion protrudes downward from the accommodation groove 73. Accordingly, when the holder abutment 1410 is accommodated in the accommodation groove 73, the angle alignment portion is shape-matched with the alignment shape-matching portion 74. Accordingly, the opening directions of the through insertion portion 1414 formed in the holder abutment 1410 are aligned and mounted corresponding to the extension direction of the fixing bar 1430 bent corresponding to the bending information bb. Through this, coupling position and direction of the holder abutment 1410 may be precisely guided such that interference with the fixing bar 1430 may be minimized.

Also, since the fixing bar 1430 interferes with an inner surface of the through insertion portion 1414, the holder abutment 1410 and the fixture f may be pushed toward a lingual side or a labial side of the alveolar bone and prevented from applying pressure. Through this, a fatigue fracture of the alveolar bone may be prevented.

That is, the mounting guide 70 is provided to simultaneously perform a mounting function for moving the holder abutments 1410 at the same time and an aligning function capable of precisely aligning the through insertion portion 1414. Accordingly, coupling of the holder abutments 1410 is quickly and easily performed such that a treatment time may be significantly reduced. Also, when the holder abutment 1410 is moved while being accommodated in the accommodation groove 73, it is matched with the fixture f at a precise position. Accordingly, when the holder abutment 1410 is fastened to the fixture f through the fastening screw 1420, fastening may be performed corresponding to the bending angle of the fixing bar 1430 without additionally correcting a position. Accordingly, since a difficulty such as reassembling and the like caused by a working error when the holder device 1400 is fixed to the target arch 3 is prevented in advance, convenience in treatment may be significantly improved.

Here, a division guide portion 76 having a thickness gradually reduced along a preset division line and divided by an external force may be formed at the bridge body portion 72. Through this, each mounting body portion 71 may be divided, and the holder abutment 1410 may be used to be separately coupled with the fixture f using each of the divided mounting body portions 71. Here, since the mounting guide 70 is manufactured using the design information corresponding to the consecutive teeth shape, the division guide portion 76 may be set as each of interdental portions having the consecutive teeth shape. That is, since tooth shapes are connected and the interdental portion formed having a relatively small thickness is used as the division guide portion 76, the mounting guide 70 may be cut only using a minimum external force.

Meanwhile, referring to FIGS. 2, 3, and 7, the impression models 2A and 3A are manufactured by being three-dimensionally printed on the basis of the planning image M. Here, the impression models 2A and 3A include a target side impression model 2A three-dimensionally printed on the basis of the surface information m2 of the target arch and an opposing side impression model 3A three-dimensionally printed on the basis of the surface information m3 of the opposing arch.

In detail, in the target side impression model 2A, a temporary anchor matching groove 2d is formed at a position corresponding to the anchor pin information D, and a temporary implantation hole 2e corresponding to the implantation information B is formed. In the target side impression model 2A, the temporary implantation hole 2e and the temporary anchor matching groove 2d are designed according to a dental restoration plan preestablished on the basis of each piece of information included in the planning image M and are manufactured by being three-dimensionally printed through the manufacturing apparatus.

As described above, unlike a conventional case in which a mold is manufactured on the basis of an impression obtained from an oral cavity of a patient and an impression model is manufactured, in the present invention, the impression model is three-dimensionally printed using digital information on the basis of a scanned image and a CT image of an oral cavity. Accordingly, while quickly manufacturing the target side impression model 2A, a matching degree between the digital impression model and the real oral cavity may be significantly improved. Through this, since the impression models 2A and 3A may be used instead of the real oral cavity when preciseness in a variety of guides, the temporary denture 30, and the like is checked and corrected.

Here, the holder device 1400 may be preliminarily installed on the target side impression model 2A before being directly installed on the target arch. In detail, the holder abutment 1410 is temporarily coupled with a temporary implantation hole 2e. Here, the holder abutment 1410 may be understood as being temporarily coupled with an analog 4 coupled with the temporary implantation hole 2e. Here, the through insertion portion 1414 is temporarily coupled with the analog 4 after a coupling direction of the holder abutments 1410 is aligned corresponding to the extension direction of the fixing bar 1430 bent corresponding to the bending information bb.

Also, when the fixing bar 1430 is moved to the upper side of the holder abutment 1410 and inserted into the through insertion portion 1414, the coupling direction of the holder abutments 1410 and a bent state of the fixing bar 1430 may be confirmed. That is, after the coupling direction of the holder abutments 1410 is precisely aligned in the target side impression model 2A and the bent state of the fixing bar 1430 is checked, correction of an angle may be performed as necessary.

Meanwhile, when a process of flattening the alveolar bone is necessary, flattening information aligned with the alveolar bone information A in a horizontal direction may be further set in the planning image M. The flattening information may be utilized as criteria for flattening the alveolar bone when it is difficult to fix the holder device 1400 at a uniform height due to excessive bending of the alveolar bone. In detail, the flattening information may be set to be spaced downward (upward in the case of an upper jaw) from an outermost end of the alveolar bone information A in consideration of a volume of the holder device 1400 fixed to the target arch in order to install the digital overdenture in the oral cavity. Here, the implantation information B may be set such that a top end corresponds to the flattening information.

Also, a temporary flattened surface corresponding to the flattening information may be formed in the target side impression model 2A, and the temporary implantation hole 2e may be formed inside the temporary implantation surface. Also, a flattening guide for flattening the alveolar bone may be designed and manufactured before implanting the fixture f.

In detail, an inner surface of the flattening guide is shape-matched with the alveolar bone of the target arch while a region corresponding to the implantation information of the fixture may be opened. Here, a top surface of an opening portion of the flattening guide may be formed to be flattened to guide movement of a flattening device configured to flatten the alveolar bone. That is, one side of the flattening device flattens the alveolar bone exposed inside the opening portion of the flattening guide such that the alveolar bone may be flattened at a uniform height.

Here, the flattening guide may include a flattening anchor fixing portion through which the anchor pin passes to be fixed to the target arch. Accordingly, even when vibrations occur during a process of flattening the alveolar bone using the flattening device, movement of the flattening guide may be prevented. In addition, the flattening anchor fixing portion may be formed on the basis of the same anchor pin information as that of the implantation anchor fixing portion. Accordingly, during a process of sequentially installing the implantation guide after separating the flattening guide, when the anchor pin is implanted into an anchor hole preformed in the target arch, the anchor pin may be fixed at a precise position according to a preestablished dental restoration plan.

As described above, according to the present invention, a coupling state between the holder abutments 1410 and the fixing bar 1430 may be confirmed in advance and precisely corrected through the target side impression model 2A. Accordingly, the holder device 1400 may be fixed to the real oral cavity corresponding to the preestablished dental restoration plan. Also, since a shape-matching level with the digital overdenture 60 designed and manufactured according to the dental restoration plan is improved, preciseness in intraoral installation may be significantly improved.

In addition, it is possible to prevent the alveolar bone from being broken by an applied restoring pressure caused by the fixing bar 1430 being bent at an imprecise angle. Also, since the coupling direction of the holder abutment 1410 is adjusted in the oral cavity, the discomfort of a patient who opens his or her mouth for a long time and inconvenience in fixing the holder device 1400 due to a small oral cavity may be fundamentally removed.

Meanwhile, referring to FIG. 7, the temporary denture 30 corrected to form a temporary holder insertion portion 35 where the holder device 1400 is inserted into and shape-coupled with an inner surface part thereof is prepared. Here, the temporary denture 30 may be corrected using the target side impression model 2A on which the holder device 1400 is preliminarily installed and the opposing side impression model 3A occluded with a top thereof.

In detail, the temporary denture 30 includes a temporary tooth portion 32 having an outer surface occluded with the target arch or the opposing side impression model 3A and a denture body portion 31 in which a temporary gum portion 33 surrounding a bottom end part of the temporary tooth portion 32 is integrally formed. Also, a shape-matching correction groove portion 34 formed on an inner surface side of the denture body portion 31 is included.

Here, the denture body portion 31 may be provided while being normalized for general use corresponding to a preset standard dental arch profile. Here, the standard dental arch profile may be understood as a shape in which a virtual arc-shaped line or a virtual area corresponding to a real tooth arrangement extends. The standard dental arch profile may be calculated while being standardized in consideration of anatomical deviations for age and gender and set while being normalized for each stage to be commonly applied to a variety of oral cavities of patients. For example, the denture body portion 31 may be prepared as ready-made articles normalized by large/medium/small.

In addition, the denture body portion 31 may be pre-manufactured as a real product but may be more preferably prepared as 3D design information corresponding to the denture body portion 31. Accordingly, the design information of the denture body portion 31 may be prestored in the planning portion and may be transmitted to and three-dimensionally printed through the manufacturing apparatus as necessary.

Here, the denture body portion 31 may be formed by three-dimensionally printing a material which is softened when being heated to a preset temperature or higher such that the temporary gum portion 33 side is pressurized and deformed corresponding to the vertical dimension VD through an occlusal pressure. For example, the denture body portion 31 is formed of a base resin including an acrylic oligomer. Also, the denture body portion 31 formed by three-dimensionally printing the base resin, that is, an inner surface of the temporary gum portion 33 is immersed in hot water heated at a temperature within a softening temperature range of 60 to 70° C. and heated to be softened.

Also, the heated denture body portion 31 is installed between the target side impression model 2A and the opposing side impression model 3A and an occlusal pressure is applied thereto. Through this, the temporary gum portion softened by being heated may be preliminarily deformed to correspond to the vertical dimension VD and the dental arch line of the target arch. As described above, since the denture body portion 31 is prepared while being normalized for general use, a high-level skill is not necessary for design and manufacturing. Since the denture body portion 31 is easily corrected to fit an oral cavity for each patient even when being normalized, preciseness thereof may be significantly improved.

Here, the temporary tooth portion is formed as a tooth shape in which a morsal surface and an interdentium preset to be occluded with the opposing arch are displayed. Also, the temporary gum portion may integrally extend from the temporary tooth portion while a marginal groove 33a may be formed on an inner surface side to surround the target arch while being spaced apart therefrom. Here, the marginal groove 33a may be formed to be recessed toward the temporary tooth portion in consideration of a protruding volume of the holder device 1400 installed in the alveolar bone. Also, the marginal groove 33a is filled with a dental resin and is disposed above the target side impression model 2A on which the holder device 1400 is preliminarily installed while being pressurized by the occlusal pressure.

Here, the dental resin filled in the marginal groove 33a may be understood as a relining resin. Through this, a groove corresponding to an external shape of the holder device 1400 is formed to be engraved into the relining resin and cured as the temporary holder insertion portion 35. The temporary holder insertion portion 35 formed as described above is utilized as design information of a holder insertion portion 65 of the digital overdenture 60 (refer to FIG. 10A) which will be described below. Also, when the temporary denture 30 is temporarily used instead of the digital overdenture 60, the temporary denture 30 may be utilized as a coupling area inserted into the holder device 1400 and temporarily fixed thereto.

Meanwhile, the temporary denture 30 is manufactured and corrected through a series of processes as follows.

In detail, design information on one denture body portion 31 appropriate for an oral cavity of a patient is selected and extracted from a digital library included in the planning portion or connected through wires or wirelessly. Here, the digital library may be preferably understood as a database in which basic external shape information of a component used for dental restoration is stored as 3D vector data. The digital library includes a plurality of pieces of digital external shape information about the real holder abutment 1410, the real fixing bar 1430, and the real fixture f. In addition, the digital library includes a plurality of pieces of digital external shape information about the temporary denture 30 and the digital overdenture 60 which will be described below.

Also, the design information of the denture body portion 31 is transmitted to and three-dimensionally printed by the manufacturing apparatus. Here, the three-dimensionally printed denture body portion 31 may be preliminarily exposed to curing light for 30 to 60 seconds and semi-cured. Here, the curing light may be understood as ultraviolet (UV) light within a UV-A range having a wavelength of, particularly, 300 to 400 nm. Here, being preliminarily exposed may be understood as being exposed to the curing light to be light-cured to the degree of being softened such that a shape thereof is deformable when a certain pressure (for example, an occlusal pressure of the oral cavity) is applied while being heated within the softening temperature range.

Also, the inner surface of the semi-cured denture body portion 31 is heated within the softening temperature range and is installed between the target side impression model 2A and the opposing side impression model 3A to be occluded. Through this, the denture body portion 31 normalized for general use may be primarily corrected to have a size and a height more appropriate for the oral cavity of the patient. Subsequently, the primarily corrected denture body portion 31 may be exposed to the curing light for 4 to 5 minutes and completely cured. Here, complete curing may be understood as irreversibly curing the denture body portion 31 so as not to be softened or deformed not only at the occlusal pressure but also at a temperature above the softening temperature range.

Also, the marginal groove 33a is filled with the relining resin, and the holder device 1400 is installed on the preliminarily installed target side impression model 2A. Through this, the temporary holder insertion portion 35 engraved into the relining resin corresponding to an external shape of the holder device 1400 is formed.

Here, a process of curing using curing light in a process of correcting the temporary denture 30 is performed while being divided into stages. Accordingly, when the temporary denture 30 is heated, the temporary denture 30 may be prevented from being deformed in an entire shape thereof during a correction stage while being cured to be appropriately corrected for the oral cavity. Also, a difficulty in correcting the temporary denture 30 may be fundamentally removed by completely light-curing right after 3D printing. As described above, while the denture body portion 31 is cured through multiple stages, to stably sustain an occlusal pressure, correction is performed to fit a dental arch line and a vertical dimension VD (refer to FIG. 2) of a patient. Accordingly, a synergistic effect of improving preciseness in shape-matching the temporary denture 30 with the oral cavity and supporting strength of the temporary denture 30 may be provided.

Meanwhile, referring to FIGS. 7 to 9, a height is pressurized and deformed corresponding to the vertical dimension VD and an entirety of the inner and outer surfaces of the temporary denture 30 corrected so as to engrave the temporary holder insertion portion 35 in an inner side of the shape-matching correction groove portion 34 is scanned. Through this, an auxiliary scanned image m30 corresponding to the temporary denture 30 is obtained. Also, a corrected-scanned image m30A swapped such that 3D surface information of the temporary holder insertion portion 35 is exposed outward may be obtained from the auxiliary scanned image m30.

In detail, the auxiliary scanned image m30 is transmitted to the planning portion, and a boundary line X is set between 3D surface information of the temporary gum portion and 3D surface information of the temporary tooth portion. Here, the boundary line X may be set along an outer side of an inner surface part of the temporary gum portion. Also, an inner surface side of the boundary line X is set as a fastening region portion, and the 3D surface information of the temporary denture 30 except the fastening region portion is set as an elimination region m39. Subsequently, the elimination region m39 is eliminated and inner side surface information of the temporary holder insertion portion 35 is swapped to be exposed outward so as to obtain the corrected-scanned image m30A. That is, the corrected-scanned image m30A may be understood as image information in which only 3D surface information m33 of the inner part including 3D surface information m35 of the temporary holder insertion portion is displayed in the auxiliary scanned image m30.

Here, like a process of designing the mounting guide 70, the 3D surface information included in the auxiliary scanned image m30 is stored as surface information substantially having no thickness. Accordingly, an inner surface portion of the digital overdenture may be set on the basis of the corrected-scanned image m30a including the 3D surface information m35 of the temporary holder insertion portion.

As described above, design information on the inner surface part of the digital overdenture is obtained on the basis of a scanned image of the temporary denture 30 corrected such that the holder device 1400 is inserted to be shape-matched and the temporary holder insertion portion 35 is formed. Here, the real holder device 1400 is pressurized such that the temporary holder insertion portion 35 is formed to be engraved. Accordingly, the holder insertion portion designed and manufactured on the basis of the 3D surface information m35 of the temporary holder insertion portion may be formed at a precise position.

In addition, unlike a real oral cavity, the temporary denture 30 may be scanned through a fixed type scanner. That is, since it is possible to scan an entirety of inner and outer surfaces of the temporary denture 30 without moving a scanner or the temporary denture 30, distortion of the corrected-scanned image m30A is minimized Through this, preciseness in designing and manufacturing the digital overdenture 60 and a degree of shape-matching with the oral cavity may be further improved.

Here, design information m60 of the digital overdenture may be obtained through a series of processes as follows.

First, a virtual artificial tooth portion and a virtual artificial gum portion are extracted from the digital library and virtually arranged between the surface information m2 and m3 (refer to FIG. 2) of the target arch and the opposing arch included in the planning image M (refer to FIG. 2). Here, as the virtual artificial tooth portion and the virtual artificial gum portion, optimum digital external shape information for the oral cavity of the patient may be extracted from a plurality of pieces of digital external shape information included in the digital library and virtually arranged in the planning image M. Also, an inner surface of the virtual artificial gum portion may be swapped in the corrected-scanned image m30A. That is, the surface information m2 of the target arch and the corrected scanned image m30A are arranged to be aligned on the basis of a mutual common part while an inner side part contour of the virtual artificial gum portion is swapped in the corrected scanned image m30A. Also, the corrected-scanned image m30A may be corrected to be replaced with a virtual holder device m40 extracted from the digital library to be matched.

Also, the virtual holder device m40 is extracted from the digital library. Here, the virtual holder device m40 may be extracted as digital external shape information corresponding to a state in which a plurality of such virtual holder abutments m41 and a virtual fixing bar m43 connected therethrough are set as one. Also, while the virtual holder device m40 is virtually disposed in the planning image M, a comparative region with the corrected-scanned image m30A is calculated. Here, the virtual holder abutments m41 and the virtual fixing bar m43 are virtually adjusted to be matched with the corrected-scanned image m30A.

Also, when the virtual holder device m40 and the corrected-scanned image m30A are matched with each other, the 3D surface information m35 of the temporary holder insertion portion in the corrected-scanned image m30A is corrected instead of the virtual holder device m40. Accordingly, unevenness, notches, and air holes generated as the temporary holder insertion portion 35 is pressurized by the holder device 1400, or distortion or damage capable of occurring during a scanning process is removed. Through this, the holder insertion portion 65 (refer to FIG. 10A) into which the holder device 1400 is inserted is aligned at a precise position on the basis of the corrected-scanned image m30A while a shape may be clarified and precisely formed on the basis of the virtual holder device m40.

Here, a virtual clip m67 may be virtually disposed on the virtual holder device m40. Also, a virtual fixing region to be matched with the virtual clip m67 is set to be overlapped with the virtual artificial gum portion, and design information of the digital overdenture 60 (refer to FIG. 10A) is generated. In detail, the virtual fixing region having a cylindrical shape is virtually disposed to intersect with the virtual fixing bar m43 included in the virtual holder device m40. Also, the virtual holder device m40 and the virtual fixing region overlapped with the virtual artificial gum portion are swapped with design information m65 of the holder insertion portion and design information m66 of the fixing hole. Accordingly, design information of the artificial gum portion including the holder insertion portion 65 and a fixing hole 66 (refer to FIG. 10A) may be obtained. Here, since a process of swapping the virtual holder device m40 and the virtual fixing region with the design information m65 of the holder insertion portion and the design information m66 of the fixing hole is the same as a process of obtaining the design information of the mounting guide 70, a detailed description will be omitted.

As described above, in the present invention, a dental restoration plan such as implanting of the fixture, mounting and fixing of the holder abutment 1410, and designing of the temporary denture 30 and the digital overdenture 60 is established on the basis of the surface information m2 and m3 and alveolar bone information obtained from the real oral cavity and the digital external shape information stored in the digital library. Also, preciseness of the holder device 1400 and auxiliary devices used in the process of manufacturing the digital overdenture 60 may be previously checked using the impression models 2A and 3A corresponding to the oral cavity.

Through this, a patient only requires a minimum of visits such as for scanning and CT-image capturing an oral cavity, implanting the fixture and the holder device, and finally installing the digital overdenture. Also, since auxiliary devices necessary for each stage and the temporary denture are quickly manufactured through 3D printing on the basis of information prestored in the digital library, only a minimum working time is consumed in a visit for each stage to a practitioner. Accordingly, a problem of a conventional apparatus in which a patient should frequently visit and open his or her mouth for a long time may be fundamentally removed. In addition, since accurate design information of the digital overdenture is obtained through the corrected temporary denture while the temporary denture is temporarily usable during a manufacturing period of the digital overdenture 60, patient convenience may be further improved.

Meanwhile, referring to FIGS. 9 to 10B, the design information m60 of the digital overdenture is transmitted to and three-dimensionally printed by the 3D printer such that a real digital overdenture 60 is manufactured. Here, the digital overdenture 60 includes an artificial tooth portion and an artificial gum portion. Here, the holder insertion portion 65 is formed on an inner surface side of the artificial gum portion to be recessed on the basis of the design information m65 of the holder insertion portion. In addition, the real fixing hole 66 is formed to pass therethrough on the basis of design information of the virtual fixing hole m66.

Also, a clip 67 may be fixed to an inside of the fixing hole 66 so as to detachably fasten the digital overdenture 60 to the holder device 1400. Here, the clip 67 includes a mounting protrusion 67a protruding to one side at one end and a coupling body portion 67b formed at the other end. Here, an inner surface of the coupling body portion 67b is shape-matched with an outer surface of the fixing bar 1430 and includes an opening portion opened less than an outer diameter of the fixing bar 1430. That is, the mounting protrusion 67a of the clip 67 is partially inserted into the fixing hole 66 while being embedded and fixed using a curable resin r, and the coupling body portion 67b is insertion-coupled with the clip 67 and fixes the digital overdenture 60 to the oral cavity.

Here, the clip 67 is fixed to the inside of the fixing hole 66 through a series of processes as follows. In detail, the holder device 1400 is fixed to the fixture f (refer to FIG. 5B) implanted into the alveolar bone. Here, the holder abutments 1410 are mounted and moved at the same time using the mounting guide 70 (refer to FIG. 5B). Also, the clip 67 is coupled to one side of the fixing bar 1430 fixed via the holder abutment 1410. Here, the clip 67 may be installed corresponding to a position of the virtual holder device m40 (refer to FIG. 8) at which the virtual clip m67 (refer to FIG. 8) is virtually disposed. To this end, a mark corresponding to the position at which the virtual clip m67 is virtually disposed may be displayed on the fixing bar 1430.

Also, the digital overdenture 60 is installed in the target arch 2 such that the holder device 1400 is to be inserted into the holder insertion portion 65. Here, it may be understood that the artificial gum portion is installed at the target arch 2. That is, in the case of the digital overdenture 60, a final digital overdenture 60 may be manufactured by separately manufacturing the artificial gum portion and the artificial tooth portion and assembling and attaching and fixing the artificial tooth portion with and to a top surface side of the artificial gum portion. Here, in the case of the artificial tooth portion, artificial teeth corresponding to teeth such as anterior teeth, dog teeth, molar teeth, and the like are separately formed and individually matched with and fixed to a tooth coupling groove formed on the top surface side of the artificial gum portion.

Meanwhile, the holder insertion portion 65 includes a first shape-matching portion 65a corresponding to an outer surface shape of the holder abutment 1410 and a second shape-matching portion 65b corresponding to an outer surface shape of the fixing bar 1430. Accordingly, when the holder device 1400 is inserted into the holder insertion portion 65, it may be restrained by a step between the first shape-matching portion 65a and the second shape-matching portion 65b so that forward, backward, leftward, and rightward movements may be restricted. Also, as the clip 67 is insertion-coupled with the fixing bar 1430, the digital overdenture 60 may be prevented from being arbitrarily separated from the oral cavity.

Here, as a position at which the clip 67 is coupled to the fixing bar 1430 is checked through the fixing hole 66 and the curable resin r is injected into the fixing hole 66 and cured, the clip 67 is fixed to the fixing hole 66. Here, the curable resin r may be formed of the same material as a material used for manufacturing the artificial gum portion. Through this, the curable resin r may be integrally cured with the artificial gum portion through a high level of adhesion between the same materials, and the clip 67 partially embedded in the curable resin r may be firmly fixed.

Here, a rubber dam portion J which covers an outer surface of the target arch 2 may be installed so as to cure the curable resin r while being partitioned from the target arch 2. The rubber dam portion J may be installed before or after the holder abutment 1410 is coupled with the fixture f. In addition, the rubber dam portion J may be more preferably installed to cover the target arch 2 before the artificial gum portion is installed in the oral cavity. The rubber dam portion J may be provided as a flexible thin rubber plate and includes a through hole through which the holder abutment 1410 passes. Through this, even when the curable resin r flows down to the oral cavity through the fixing hole 66, it is possible to prevent the curable resin r from adhering to a gum or peripheral oral tissue.

In addition, the digital overdenture 60 may be manufactured by further including a process in which the relining resin is applied to and occluded with the inner surface part thereof through an occlusal pressure to be reinforced and corrected. Since the digital overdenture 60 is more precisely shape-matched with a real oral cavity through this, when the digital overdenture 60 is installed in the oral cavity of the patient and then chewing is performed, the movement, shaking, and separation of the digital overdenture 60 may be prevented.

FIGS. 11A and 11B are exemplary views illustrating a modified example of the process of fixing the clip in the method of manufacturing the digital overdenture according to one embodiment of the present invention, and FIG. 12 is an exemplary view illustrating an example of using the clip mounting holder applied to the method of manufacturing the digital overdenture according to one embodiment of the present invention. In the modified examples, since basic components except a size of a fixing hole 166 and a process of fixing a clip 167 are the same as the above-described one embodiment, a detailed description on the same components and method will be omitted.

As shown in FIGS. 11A and 11B, the virtual fixing region may be set as a cylindrical shape including an error tolerance margin portion exceeding a sectional area of the virtual clip m67 (refer to FIG. 8) and may be virtually disposed to intersect with the virtual fixing bar m43 (refer to FIG. 8). Here, the error tolerance margin portion may be understood as a virtual interval set while extending laterally on the basis of the sectional area of the virtual clip m67. Accordingly, in the design information of the digital overdenture, design information of the fixing hole may be set as a size such that the virtual clip m67 passes therethrough.

Also, the fixing hole 166 formed in the digital overdenture on the basis of the design information of the fixing hole may be formed to have a size exceeding the sectional area of the clip 167. Through this, the clip 167 may install a digital overdenture 160 in the target arch 2 such that the holder device 1400 is inserted into a holder insertion portion 165 and then may pass through the fixing hole 166 and be held by and coupled with the fixing bar 1430.

As described above, the fixing hole 166 is designed such that a sectional area of the fixing hole 166 includes the error tolerance margin portion to be greater than the sectional area of the clip 167. Accordingly, when the fixing hole 166 is formed to be greater than the sectional area of the clip 167, the artificial gum portion is installed in the oral cavity and the clip 167 passes through the fixing hole 166 and is easily held by and coupled with the fixing bar 1430.

Here, when the clip 167 passes through the fixing hole 167, the clip 167 is fixed to the outer surface of the fixing bar 1430 which intersects with an inside thereof. Accordingly, worker inconvenience of precisely adjusting a position at which the clip 167 is coupled with the fixing bar 1430 to correspond to the inside of the fixing hole 166 before installing the digital overdenture 160 in the oral cavity may be minimized. Also, since an end of the clip 167 is fixed to a precise position through curing of the curable resin r filled inside the fixing hole 166, convenience in manufacturing the digital overdenture 160 and preciseness in installation in the oral cavity may be significantly improved.

Also, referring to FIGS. 11A and 12, a clip mounting holder 80 may be understood as a device which mounts the clip 167 to allow the clip 167 to pass through the fixing hole 166 and be coupled with the fixing bar 1430. Here, the clip mounting holder 80 includes a handle portion 81 formed to extend on one side and an elastic finger portion 82 formed at an end protruding from the other side of the handle portion 81.

In detail, the elastic finger portion 82 includes a grip groove 82a recessed to a certain depth therein and a division slot groove 83 cut in a longitudinal direction along a circumferential direction. Here, an inner diameter of the elastic finger portion 82, that is, a diameter of the grip groove 82a may be formed to be smaller than or equal to an outer diameter of a mounting protrusion 167a. Accordingly, when the mounting protrusion 167a is inserted into the grip groove 82a, a sectional area of the elastic finger portion 82 divided through the division slot groove 83 extends and is elastically deformed. Also, the mounting protrusion 167a may be firmly held and coupled through an elastic restoring force of the elastic finger portion 82.

In addition, a grip step portion 84 may protrude radially inward from an inner surface of the elastic finger portion 82 so as to be held by and coupled with a mounting groove recessed radially inward along an outer circumference of the mounting protrusion 167a. Here, the grip step portion 84 is formed to have an inner diameter smaller than the outer diameter of the mounting protrusion 167a and greater than an inner diameter of the mounting groove. Accordingly, the clip 167 may be prevented from being separated from the clip mounting holder 80 while being held by the elastic finger portion 82 before being coupled with the fixing bar 1430.

Here, a pressurizing cover portion 85 which slidably moves along the other end part of the clip mounting holder 80 and selectively surrounds an outer circumference of the elastic finger portion 82 may be further included. In detail, the pressurizing cover portion 85 is formed as a hollow shape such that an inner surface thereof corresponds to an outer surface of the elastic finger portion 82, and slidably moves in a longitudinal direction along the outer surface of the elastic finger portion 82. Here, while the clip 167 is held by and coupled with the elastic finger portion 82, the pressurizing cover portion 85 is slidably moved and is disposed to surround the outer side of the elastic finger portion 82.

Accordingly, since the pressurizing cover portion 85 is pressurized radially inward and the mounting protrusion 167a is held by and coupled with an inside of the grip groove 82a with a strong force, it is possible to prevent the clip 167 from being separated from the clip mounting holder 80 and being contaminated. Also, since the clip mounting holder 80 is formed in a thin stick shape, the clip mounting holder 80 may easily pass through the fixing hole 166 and reach the fixing bar 1430. Accordingly, since it is unnecessary to form an excessively large fixing hole 166, a consumption amount of the curable resin r is reduced and a curing time of the curable resin r is reduced such that manufacturing convenience may be significantly improved.

Here, a process of fixing the clip 167 using the clip mounting holder 80 will be described as follows. First, the digital overdenture 160 is installed in the oral cavity so as to insert the holder device 1400 fixed to the target arch 2 into the holder insertion portion 65. Also, the clip 167 is elastically coupled with a elastically opened end side of the clip mounting holder 80, that is, the elastic finger portion 82 and passes through the fixing hole 166. Here, a coupling body portion 167b formed on the other end of the clip 167 is insertion-coupled with the fixing bar 1430. Subsequently, the curable resin r is injected into the fixing hole 166 and cured such that the clip mounting holder 80 is separated from the clip 167 while one end of the clip 167 is partially embedded. Through this, the clip 167 may be precisely and firmly fixed to the digital overdenture 160.

FIGS. 13 and 14 are exemplary views illustrating an applied fixing bar bending apparatus for the holder device and an example of using the fixing bar bending apparatus in the method of manufacturing the digital overdenture according to one embodiment of the present invention.

In detail, referring to FIGS. 4A, 13, and 14, the bending information bb of the fixing bar 1430 is set on the basis of the implantation information B and is a criterion for aligning the through insertion portion 1414 formed in the holder abutment 1410. Here, the bending information bb includes the bending angle d and bending centers set at positions spaced from both sides of a central part of the fixing bar 1430. That is, both end parts of the fixing bar 1430 are bent corresponding to the bending angle d on the basis of the bending centers spaced at a preset interval.

The bending centers and the bending angle d may be set according to a dental arch and a size of an alveolar bone of a patient. Also, a fixing bar bending apparatus 90 for the holder device 1400 may be provided to precisely bend the fixing bar 1430 according to the bending information bb. The fixing bar bending apparatus 90 for the holder device will be referred to as the fixing bar bending apparatus 90. Here, the fixing bar bending apparatus 90 includes a base portion 91, a bending guide 92, and a mounting stick 98.

In detail, the base portion 91 is provided in a plate shape having a certain thickness and area and includes interval adjustment slot holes 93 formed to pass through both sides along a longitudinal direction. Here, a stopper portion 94 protrudes upward from one side of the interval adjustment slot hole 93 to flatly support the central part of the fixing bar 1430.

Also, a pair of such bending guides 92 may be provided and moved along the interval adjustment slot holes 93 and may include a bending block 95 and a pressurizing-fixing portion 96. In detail, the bending block 95 has one surface facing the other surface of the stopper portion 94 and is disposed above the interval adjustment slot hole 93.

Here, a bending support end 95a is formed at each corner of one surface side of the bending block 95 facing the stopper portion 94 such that both end sides of the fixing bar 1430 are disposed in a space from the stopper portion 94 and bent at the same time. Also, the pressurizing-fixing portion 96 provides a pressurizing force to fix a position where the bending block 95 has been moved along the interval adjustment slot hole 93. That is, an edge of the interval adjustment slot hole 93 is clamped between the bending block 95 and the pressurizing-fixing portion 96 using the pressurizing force of the pressurizing-fixing portion 96 such that the moved position is fixed.

In addition, a pair of such mounting sticks 98 are provided such that both ends of the fixing bar 1430 are inserted, and each of the mounting sticks 98 includes a mounting insertion hole 98a formed in one end side and a handle portion 98b formed to longitudinally extend on the other side. That is, the central part of the fixing bar 1430 is disposed between the stopper portion 94 and a pair of such bending blocks 95. Also, both end parts of the fixing bar 1430 which extend outward from the bending block 95 are inserted into the mounting insertion holes 98a of the mounting sticks 98.

Also, through a bending force applied by a worker gripping and bending the mounting sticks 98 with both hands, bending is performed corresponding to the bending information bb. Here, when each end part of the fixing bar 1430 is inserted through the mounting insertion hole 98a, one end of the mounting stick 98 is disposed to be adjacent to the bending support end 95a.

Here, one end of the mounting stick 98 adjacent to the bending support end 95a becomes a point which receives the bending force, and the handle portion 98a side becomes a point which applies the bending force. Accordingly, the fixing bar 1430 may be easily bent even with a small force through the lever principle. Here, the central part of the fixing bar 1430 is supported by the stopper portion 94. Accordingly, even when the bending force is applied to both end part sides of the fixing bar 1430, the central part of the fixing bar 1430 may be prevented from protruding roundly at one side.

Here, the bending support end 95a may be formed as a rounded curved corner. In detail, the bending support end 95a may be rounded to have a certain radius value while a rounded outer surface central part of the bending support end 95a may be set as the bending center. Also, when the worker grips the mounting sticks 98 and applies the bending force, the outer surface of the fixing bar 1430 comes into contact with and is supported by the bending support ends 95a and is processed to be bent corresponding to the bending angle d.

Through this, even when the fixing bar 1430 is supported by the bending support ends 95a and processed to be bent, parts which come into contact with the bending support ends 95a may be formed in a smoothly rounded curve shape. Also, since a corner on one surface side of the bending block 95 is formed to be angular, the fixing bar 1430 may be bent while supported and prevented from being excessively bent to be broken. In addition, since the corner on one surface side of the bending block 95 is formed to be angular, deformation or damage caused by repetitive pressurizing may be prevented.

Also, since one end of the mounting stick 98 is disposed to be adjacent to the bending support end 95a, the bending center at which the fixing bar 1430 is bent may be clearly formed at the outer surface central part of the bending support end 95a. Accordingly, the fixing bar 1430 may be processed to be precisely bent corresponding to the bending information bb. That is, the fixing bar 1430 may be processed to be bent such that a bent shape thereof precisely corresponds to the opening directions of the through insertion portion 1414 formed in the holder abutment 1410. Through this, the fixing bar 1430 may be easily inserted into each of the through insertion portions 1414 of the holder abutments 1410 coupled with the fixtures f without interference.

In addition, unlike a conventional case in which both ends of the fixing bar 1430 is gripped by hands and simply bent in a gentle curve shape, in the present invention, the fixing bar 1430 is processed to be bent while being engaged between the bending block 95 and the stopper portion 94. Accordingly, the bending center may come into contact with the bending support end 95a and be precisely formed.

Accordingly, in comparison to a conventional device bent in a gentle curve shape with a great restoring force being applied, when the fixing bar bending apparatus 90 is used, the fixing bar 1430 may be plastically deformed in a precisely bent state corresponding to the bending information bb. Through this, a restoring-pressurizing force may be minimized even when the fixing bar 1430 is processed to be bent, and a fatigue fracture of the alveolar bone caused by the restoring-pressurizing force of the fixing bar 1430 may be prevented while the holder device 1400 is fixed to the alveolar bone.

Here, an interval indicator portion 97 which guides an interval of the bending block 95 may be formed on the other side of the interval adjustment slot hole 93 in order to form the bending center of the fixing bar 1430 at a position corresponding to the bending information bb. Also, an alignment edge 95b aligned corresponding to the interval indicator portion 97 may be formed on the other surface of the bending block 95. That is, the bending block 95 is formed such that a corner on one side facing the stopper portion 94 is formed to be rounded while a corner on the other side is formed to be rectangular. Accordingly, simply, when the interval indicator portion 97 in which length intervals are indicated as gradations corresponding to preset standard intervals coincides with the alignment edge 95b on the other side of the bending block 95, the bending part of the fixing bar 1430 may be easily adjusted with intervals set in the bending information bb.

In addition, a step support portion 94a may be formed, to be stepped in a step shape, at a bottom end part of the stopper portion 94 facing the interval adjustment slot hole 93. Also, one surface of the bending block 95 facing the stopper portion 94 may be formed to be gradually inclined toward a top end to be adjacent to the stopper portion 94. That is, the stopper portion 94, an opposing surface of the bending block 95, and a top surface of the step support portion 94a are arranged in a triangular shape.

Accordingly, when the fixing bar 1430 is disposed between the stopper portion 94 and the pair of bending blocks 95, the outer surface of the fixing bar 1430 is supported at three points by the stopper portion 94, the inclined opposing surfaces of the bending blocks 95, and the top surfaces of the step support portions 94a. Through this, it is possible to prevent a position of the fixing bar 1430 from deviating due to a force applied when the fixing bar 1430 is processed to be bent or to prevent the fixing bar 1430 from slipping upward between the bending blocks 95 and the stopper portion 94.

Meanwhile, the pressurizing-fixing portion 96 may include an extending bolt portion 96a and a pressurizing nut 96b. In detail, the extending bolt portion 96a vertically passes through the bending block 95 while a bottom end part passes through the interval adjustment slot hole 93 and extends downward. Also, the pressurizing nut 96b is screw-fastened with the bottom end part of the extending bolt portion 96a. That is, an interval between the pressurizing nut 96b and the bending block 95 is decreased by a rotational fastening force applied when the pressurizing nut 96b is screw-fastened to the bottom end part of the extending bolt portion 96a. Through this, an edge of the interval adjustment slot hole 93 is pressurized between the bending block 95 and the pressurizing nut 96b such that a moved position of the bending guide 92 may be fixed.

Here, a slide alignment surface 93a recessed stepwise to have an inner diameter greater than the interval adjustment slot hole 93 may be formed below the interval adjustment slot hole 93. In detail, the slide alignment surface 93a may be formed to have an inner diameter corresponding to a horizontal interval of the pressurizing nut 96b. In addition, the slide alignment surface 93a may be formed to have an inner diameter which comes into surface contact with and supports a D-cut portion 96c formed on an outer surface side of the pressurizing nut 96b.

That is, while the pressurizing nut 96b is simply screw-fastened to the bottom end part of the extending bolt portion 96a, an arrangement direction is aligned inside the slide alignment surface 93a and only movement to both sides is guided. Accordingly, the interval between the bending block 95 and the pressurizing nut 96b is adjusted by gripping and rotating a rotation manipulation portion formed at a top end part of the extending bolt portion 96a such that the bottom end part of the extending bolt portion 96a is screw-fastened to or released from the pressurizing nut 96b to be tightened or moved upward.

As described above, in the present invention, the fixing bar 1430 may be processed to be precisely bent corresponding to the bending information bb using the fixing bar bending apparatus 90. Here, the fixing bar 1430 is supported by the rounded curve support portion of the bending guide 92 such that the bending center is formed at a precise position. Through this, the fixing bar 1430 may be processed to be precisely bent according to a preset dental restoration plan and may be easily fixed to the holder abutment 1410 at a precise position.

Meanwhile, although not shown in the drawings, an angle indicator portion which guides the bending angle d may be provided outside each of the bending blocks 95. Here, the angle indicator portion may indicate angular intervals as gradations corresponding to preset standard intervals. Accordingly, while each end part of the fixing bar 1430 is inserted into one end of the mounting stick 98, an extending direction of the mounting stick 98 may correspond to each gradation of the angle indicator portion 95c. Accordingly, the fixing bar 1430 may be easily processed to be precisely bent corresponding to the bending information bb.

Here, the angle indicator portion may be fixed to the bottom end part of the bending block 95 while being moved with the bending block 95 when the bending block 95 is moved along the interval adjustment slot hole 93. Accordingly, even when the pair of bending blocks 95 are adjusted and moved according to an interval between the bending centers, the fixing bar 1430 may be processed to be bent to fit the bending angle d on the basis of the bending support ends 95a.

Also, the mounting insertion hole 98a may include an uneven part into which the outer surface of the fixing bar 1430 is inserted through a frictional force. Accordingly, a state in which both end sides of the fixing bar 1430 are inserted into the mounting insertion holes 98a may be frictionally restrained. Through this, the fixing bar 1430 may be prevented from being arbitrarily separated from the mounting sticks 98 in a process in which the worker processes the fixing bar 1430 to be bent while gripping the mounting sticks 98. Also, a position which receives a force may be prevented from being changed to becoming far from the bending block 95 due to sliding of the mounting stick 98 along an outer circumference of the fixing bar 1430. Through this, the fixing bar 1430 may be processed to be precisely bent accurately corresponding to the bending information bb, and preciseness in coupling with the holder abutment 1410 may be significantly improved.

According to the embodiment of the present invention, effects are provided as follows.

First, a highly precise dental restoration plan for a patient can be established on the basis of images obtained by scanning and CT-image capturing an oral cavity and digital external shape information prestored in a digital library. Also, a variety of guides, a temporary denture, and a digital overdenture designed and three-dimensionally printed according to the plan can be accurately and precisely installed in the oral cavity.

Second, since an accommodation groove formed in a mounting guide separately corresponds to each of a plurality of pieces of implantation information and mounting is performed while opening directions of a through insertion portion are aligned by an alignment shape-matching portion protruding inward so as to be aligned with a bending angle of a fixing bar bent to intersect with the implantation information, a coupling position and direction of a holder abutment can be precisely guided such that interference with the fixing bar can be minimized.

Third, since a plurality of such holder abutments being aligned are moved to tops of fixtures by the mounting guide at the same time, a treatment time can be significantly reduced. Also, since the holder abutments correspond to the bending angle of the fixing bar without additionally correcting positions when the holder abutments being accommodated in the accommodation groove are merely fastened to the fixtures through a fastening screw, inconvenience such as reassembling caused by a working error, and the like can be prevented and treatment convenience can be significantly improved.

Fourth, opening directions of the holder abutments and the bending angle of the fixing bar can be confirmed in advance and precisely corrected using a target side impression model manufactured by three-dimensionally printing surface information of a target arch. Accordingly, safe treatment can be performed by preventing a fatigue fracture of an alveolar bone generated as a restoring pressurizing force of the fixing bar is applied due to a failure in bending of the fixing bar and an error in the opening directions of the holder abutment.

Fifth, since a sectional area of a fixing hole is designed to be formed including an error tolerance margin portion exceeding a sectional area of a clip, the clip is fixed to an outer surface of the fixing bar intersecting with an inside of the fixing hole using a simple method of installing an artificial gum portion in an oral cavity and then passing the clip through the fixing hole. Through this, since an end of the clip can be fixed to a precise position through curing of a curable resin filled in the fixing hole, convenience in manufacturing the digital overdenture and preciseness in shape-matching with a holder device fixed to the oral cavity can be significantly improved.

Sixth, when a central part of the fixing bar is engaged between a pair of bending blocks and a stopper portion while mounting sticks in which both end parts are inserted are gripped and a bending force is applied, the outer surface of the fixing bar can be supported by a corner on one surface of each of the bending blocks and the fixing bar can be processed to be precisely bent at a bending angle at which precise insertion can be performed without interference with a through insertion portion formed in the holder abutment. Here, since one end of the mounting stick is disposed to be adjacent to the corner on one surface of the bending block and becomes a point which receives the bending force and a handle portion side extending from the other side becomes a point which applies the bending force, the fixing bar can be processed to be precisely bent with a small force through the lever principle. Also, since a bent state is plastically deformed so as to minimize a restoring force, safe treatment can be performed by preventing a fatigue fracture of an alveolar bone caused by a restoring pressurizing force of a conventional fixing bar.

As described above, the present invention is not limited to the above-described embodiments and may be modified by one of ordinary skill in the art without departing from the scope of the claims of the present invention and such modifications are included within the scope of the present invention.

What is claimed is:

1. A method of manufacturing a digital overdenture, comprising:
   a first operation of aligning and setting a plurality of pieces of implantation information of fixtures according to alveolar bone information in a planning image in which surface information and alveolar bone information of a target arch and an opposing arch are displayed as three-dimensional (3D) images aligned corresponding to a preset vertical dimension;
   a second operation of designing and manufacturing a surgical guide, in which a plurality of guide holes configured to guide implanting of each of the fixtures on the basis of the implantation information are formed, and a holder abutment mounting guide, in which a plurality of accommodation grooves in which top ends of holder abutments to be coupled with the fixtures are accommodated are formed;
   a third operation of preparing a temporary denture corrected to form a temporary holder insertion portion having an inner surface part into which a holder device including the holder abutments and a fixing bar is inserted to be shape-matched therewith, in which the surgical guide is installed in the target arch to implant each of the fixtures and the fixing bar bent to intersect with the implantation information is fixed to the holder abutments moved to and coupled with top ends of each of the fixtures by the holder abutment mounting guide and through fastening screws; and
   a fourth operation of manufacturing the digital overdenture comprising an artificial gum portion having an inner surface part, at which a holder insertion portion is formed, and an artificial tooth portion set to be occluded with the opposing arch on the basis of a corrected-scanned image obtained by scanning the corrected temporary denture and swapped to outwardly expose 3D surface information of the temporary holder insertion portion.

2. The method of claim 1, wherein in the second operation, the holder abutment mounting guide is designed by:
   virtually disposing a virtual mounting base, which is rounded corresponding to a dental arch line of the target arch, between the surface information of the target arch and the surface information of the opposing arch;
   virtually disposing a virtual holder abutment corresponding to the holder abutment to be matched with the implantation information and overlapped with the virtual mounting base and virtually disposing a virtual through region having a cylindrical shape overlapped with the virtual holder abutment and extending upward; and
   swapping the virtual holder abutment overlapped with the virtual mounting base and an outer surface of the virtual through region with a virtual accommodation groove and an inner surface of a virtual through hole to be set as design information of the holder abutment mounting guide.

3. The method of claim 2, wherein in the second operation, to arrange through insertion portions of the holder abutments to be aligned corresponding to the bent fixing bar, a virtual angle alignment portion is formed at the virtual holder abutment to be recessed at a position corresponding to the through insertion portion by:
   virtually disposing the virtual holder abutment while bending information of the fixing bar is virtually disposed passing through the virtual holder abutment to intersect with the implantation information in the holder abutment mounting guide; and
   virtually rotating and aligning the virtual angle alignment portion to correspond to the bending information while the virtual angle alignment portion is swapped to protrude from an inner surface side of the virtual accommodation groove to be set as a virtual alignment shape-matching portion.

4. The method of claim 1, wherein the second operation further comprises manufacturing a target side impression model which is three-dimensionally printed on the basis of the surface information of the target arch while a plurality of temporary implantation holes are formed at positions corresponding to the implantation information, and wherein the third operation comprises:
temporarily coupling the holder abutments with the temporary implantation holes while both opening directions of each of through insertion portions of the holder abutments are adjusted such that the fixing bar bent to intersect with the implantation information by a fixing bar bending apparatus for a holder device is moved downward and inserted into the through insertion portions at the same time;
moving the holder abutments accommodated in the accommodation grooves formed in the holder abutment mounting guide to tops of the fixtures; and
fixing the holder abutment to the fixture through the fastening screw by inserting a fixing device into a through hole configured to communicate with a top of the accommodation groove.

5. The method of claim 1, wherein in the third operation, the temporary denture comprises a temporary tooth portion occluded with the opposing arch and a temporary gum portion configured to integrally extend from the temporary tooth portion and include a marginal groove formed in an inner side to surround the target arch while being spaced apart therefrom and the temporary denture is provided by three-dimensionally printing a base resin including an acrylic oligomer softened by being heated to a preset temperature such that the temporary gum portion side is pressurized-deformed corresponding to the vertical dimension, and
wherein the temporary denture is corrected by filling the marginal groove with a dental resin and engraving and curing the temporary holder insertion portion corresponding to an outer surface shape of the holder device in the dental resin using an occlusal pressure.

6. The method of claim 1, wherein in the third operation, the corrected-scanned image is obtained by setting an inner part side of the temporary gum portion as a fastening region portion in an auxiliary scanned image obtained by scanning inner and outer surfaces of the corrected temporary denture while image information except the fastening region portion is eliminated and surface information of an inner side of the temporary holder insertion portion is swapped to be exposed outward, and
wherein the fourth operation comprises virtually disposing a virtual artificial gum portion in the planning image while an inner surface of the virtual artificial gum portion is swapped in the corrected-scanned image, and virtually disposing a virtual holder device corresponding to the holder device to be overlapped with 3D surface information of the temporary holder insertion portion while the 3D surface information of the temporary holder insertion portion is eliminated and swapped and replaced with the virtual holder device.

7. The method of claim 6, wherein the fourth operation comprises virtually disposing a virtual clip corresponding to a clip detachably fastened to the fixing bar in the virtual holder device and setting design information of a fixing hole matched with the virtual clip, and
wherein the digital overdenture is manufactured by fastening the clip to the fixing bar and inserting the holder device, to which the clip is fastened, into the holder insertion portion while the clip is fixed to the fixing hole by filling and curing a fixing hole formed corresponding to the design information of the fixing hole with a curable resin.

8. A method of manufacturing a digital overdenture, comprising:
a first operation of aligning and setting a plurality of pieces of implantation information of fixtures according to alveolar bone information in a planning image in which surface information and alveolar bone information of a target arch and an opposing arch are displayed as three-dimensional (3D) images aligned corresponding to a preset vertical dimension while designing and manufacturing a surgical guide, in which a plurality of guide holes configured to guide implanting of the fixture on the basis of the implantation information are formed;
a second operation of fixing a holder device to the target arch, the holder device comprising a holder abutment, the holder abutment being coupled with each of the fixtures implanted by the surgical guide installed in the target arch, and a fixing bar bent at a bending angle intersecting with the implantation information and configured to pass through an insertion portion to fix the holder abutments to the fixing bar while preparing a temporary denture corrected to form a temporary holder insertion portion having an inner surface part into which the holder device is inserted to be shape-matched;
a third operation of obtaining a corrected-scanned image, which is swapped, by scanning the corrected temporary denture such that 3D surface information of the temporary holder insertion portion is exposed outward; and
a fourth operation of manufacturing the digital overdenture comprising an artificial tooth portion formed to be occluded with the opposing arch and an artificial gum portion formed on the basis of the corrected-scanned image to include a holder insertion portion having an inner surface part with which the holder device is shape-matched and in which a fixing hole, which has a size exceeding a sectional area of a clip detachably fastened to the holder device, passes through to allow the clip to pass therethrough and be fixed using a curable resin.

9. The method of claim 8, wherein in the fourth operation, the artificial gum portion is designed by:
virtually disposing a virtual artificial tooth portion and a virtual artificial gum portion in the planning image while an inner surface of the virtual artificial gum portion is swapped in the corrected-scanned image;
swapping 3D surface information of the temporary holder insertion portion in a virtual holder device while virtually disposing a virtual fixing region having a cylindrical shape including an error tolerance margin portion exceeding the sectional area of the clip to virtually intersect with a virtual fixing bar including the virtual holder device; and
swapping the virtual holder device overlapped with the virtual artificial gum portion and each outer surface of the virtual fixing region with design information of the holder insertion portion and the fixing hole.

10. The method of claim 8, wherein in the fourth operation, the clip is fixed to the artificial gum portion by:
installing the artificial gum portion into an oral cavity such that the holder device fixed to the fixture is inserted into the holder insertion portion while installing a rubber dam portion configured to cover an outer surface of the target arch to allow the curable resin to be cured by being partitioned from the target arch and in which an insertion hole through which the holder abutment passes is formed;
holding and coupling the clip by and with a elastically opened end side of a clip mounting holder while insertion-coupling the other end side of the clip with the fixing bar through the fixing hole; and separating the clip mounting holder from the clip while injecting and curing the curable resin into the fixing hole to partially embed one end of the clip therein.

11. The method of claim 10, wherein in the fourth operation, the clip comprises a mounting protrusion formed to protrude to one side at one end and a coupling body portion formed at the other end and having an inner surface shape-matched with an outer surface of the fixing bar and in which an opening opened less than the outer surface of the fixing bar is formed, and wherein the clip mounting holder comprises a handle portion and an elastic finger portion protruding to the other side of the handle portion and configured to have an end part having an inner diameter greater than or equal to an outer diameter of the mounting protrusion and be divided to be easily elastically deformed by extending a sectional area when the mounting protrusion is inserted thereinto.

12. The method of claim 8, wherein in the third operation, the temporary denture comprises a temporary tooth portion occluded with the opposing arch and a temporary gum portion configured to integrally extend from the temporary tooth portion and include a marginal groove formed in an inner side to surround the target arch while being spaced apart therefrom and the temporary denture is provided by three-dimensionally printing a base resin including an acrylic oligomer softened by being heated to a preset temperature such that the temporary gum portion side is pressurized-deformed corresponding to the vertical dimension, and wherein the temporary denture is corrected by filling the marginal groove with a dental resin and engraving and curing the temporary holder insertion portion corresponding to an outer surface shape of the holder device in the dental resin using an occlusal pressure.

13. The method of claim 8, wherein in the third operation, the corrected-scanned image is obtained by setting a fastening region portion along an inner part side of the temporary gum portion in an auxiliary scanned image obtained by scanning inner and outer surfaces of the corrected temporary denture while 3D surface information of the temporary denture except the fastening region portion is eliminated and surface information of an inner side of the temporary holder insertion portion is swapped to be exposed outward, and wherein the fourth operation comprises virtually disposing a virtual artificial tooth portion and a virtual artificial gum portion in the planning image while an inner surface of the virtual artificial gum portion is swapped in the corrected-scanned image, virtually disposing a virtual holder device corresponding to an outer surface of the holder device to be overlapped with 3D surface information of the temporary holder insertion portion, and eliminating the 3D surface information of the temporary holder insertion portion to be swapped and replaced with the virtual holder device.

* * * * *